US012757294B2

(12) United States Patent
Shrivastava et al.

(10) Patent No.: US 12,757,294 B2
(45) Date of Patent: Oct. 6, 2026

(54) METHOD AND UE FOR MEDIUM ACCESS CONTROL (MAC) RESET AND OTHER RRC PROCEDURES IN NR MBS COMMUNICATION

(71) Applicant: Samsung Electronics Co., Ltd., Suwon-si (KR)

(72) Inventors: Vinay Kumar Shrivastava, Bangalore (IN); Sriganesh Rajendran, Bangalore (IN); Sangkyu Baek, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 226 days.

(21) Appl. No.: 18/578,657

(22) PCT Filed: Jul. 12, 2022

(86) PCT No.: PCT/KR2022/010116
§ 371 (c)(1),
(2) Date: Jan. 11, 2024

(87) PCT Pub. No.: WO2023/287160
PCT Pub. Date: Jan. 19, 2023

(65) Prior Publication Data

US 2025/0008602 A1 Jan. 2, 2025

(30) Foreign Application Priority Data

Jul. 12, 2021 (IN) ............................ 202141031301
Feb. 28, 2022 (IN) ............................ 202241010825
Jul. 6, 2022 (IN) ............................ 202141031301

(51) Int. Cl.
*H04W 76/28* (2018.01)
*H04L 1/1812* (2023.01)
(Continued)

(52) U.S. Cl.
CPC ........... *H04W 76/40* (2018.02); *H04L 1/1812* (2013.01); *H04W 76/19* (2018.02); *H04W 76/20* (2018.02); *H04W 76/30* (2018.02)

(58) Field of Classification Search
CPC ..... H04W 76/27; H04W 76/28; H04W 76/10; H04W 76/20; H04W 76/30; H04W 76/15;
(Continued)

(56) References Cited

U.S. PATENT DOCUMENTS 8,625,486 B2 1/2014 Wang et al.
2012/0182922 A1 7/2012 Fahldieck
(Continued)

FOREIGN PATENT DOCUMENTS

KR 10-2011-0081941 A 7/2011
KR 10-202100008029 A 1/2021
(Continued)

OTHER PUBLICATIONS

International Search Report and Written Opinion of the International Searching Authority dated Oct. 25, 2022, in connection with International Application No. PCT/KR2022/010116, 8 pages.
(Continued)

*Primary Examiner* — Tu X Nguyen

(57) ABSTRACT

The disclosure relates to a 5G or 6G communication system for supporting a higher data transmission rate. Accordingly, the embodiment herein is to provide a method and a User Equipment (100) for enhancing Medium Access Control (MAC) reset mechanism and other RRC procedures in a New Radio (NR) Multicast and broadcast service (MBS) communication. The method includes receiving a service from a network device (200), where the service includes an MBS multicast service and an MBS broadcast service. Furthermore, the method includes receiving a plurality of network messages from the network device. Furthermore,
(Continued)

the method includes determining a plurality of events associated with the UE (100). Furthermore, the method includes performing the MAC reset mechanism in the MBS communication based on the service and/or the plurality of network messages, and/or the plurality of events.

14 Claims, 11 Drawing Sheets

(51) Int. Cl.
*H04W 76/19* (2018.01)
*H04W 76/20* (2018.01)
*H04W 76/30* (2018.01)
*H04W 76/40* (2018.01)

(58) Field of Classification Search
CPC . H04W 76/19; H04W 72/232; H04W 72/231; H04W 76/00; H04W 36/023; H04W 52/02; H04W 36/0007
See application file for complete search history.

(56) References Cited

U.S. PATENT DOCUMENTS

| | | | | |
|---|---|---|---|---|
| 2021/0136635 | A1 | 5/2021 | Kim et al. | |
| 2021/0410144 | A1 | 12/2021 | da Silva et al. | |
| 2022/0286818 | A1* | 9/2022 | Chin | H04W 4/06 |
| 2023/0027089 | A1 | 1/2023 | Pelletier et al. | |

FOREIGN PATENT DOCUMENTS

| | | | |
|---|---|---|---|
| KR | 10-2021-0035043 | A | 3/2021 |
| WO | 2021126924 | A1 | 6/2021 |

OTHER PUBLICATIONS

Examination report dated Feb. 13, 2023, in connection with Indian Application No. 202141031301, 6 pages.

Huawei, et al., "Discussion on MAC reset issue for CHO," R2-2106154, 3GPP TSG RAN2 #114-e, Electronic Meeting, May 19-27, 2021, 20 pages.

Intel, "Stage 3 RRC TP on RRC_INACTIVE state for E-UTRA connected to 5GC," R2-1807362, 3GPP TSG-RAN2 Meeting #102, Busan, Korea, May 21-25, 2018, 63 pages.

Oppo, et al., "Corrections for MBS," R2-2213111, 3GPP TSG-RAN WG2 Meeting #120, Toulouse, France, Nov. 14-18, 2022, 17 pages.

Samsung, "MBS Broadcast Retention," R2-2205447, 3GPP TSG-RAN WG2 Meeting #118-e, Online, May 9-20, 2022, 3 pages.

Samsung, "RRC Corrections for MBS," R2-2207039, 3GPP TSG-RAN WG2 Meeting #119-e, Online, Aug. 17-29, 2022, 3 pages.

3GPP TS 38.321 V17.2.0 (Sep. 2022), Technical Specification, 3rd Generation Partnership Project; Technical Specification Group Radio Access Network; NR; Medium Access Control (MAC) protocol specification (Release 17), Sep. 2022, 246 pages.

3GPP TS 38.321 V17.3.0 (Dec. 2022), Technical Specification, 3rd Generation Partnership Project; Technical Specification Group Radio Access Network; NR; Medium Access Control (MAC) protocol specification (Release 17), Dec. 2022, 251 pages.

3GPP TS 38.321 V17.4.0 (Mar. 2023), Technical Specification, 3rd Generation Partnership Project; Technical Specification Group Radio Access Network; NR; Medium Access Control (MAC) protocol specification (Release 17), Mar. 2023, 252 pages.

3GPP TS 38.321 V17.6.0 (Sep. 2023), Technical Specification, 3rd Generation Partnership Project; Technical Specification Group Radio Access Network; NR; Medium Access Control (MAC) protocol specification (Release 17), Sep. 2023, 253 pages.

3GPP TS 38.331 V17.3.0 (Dec. 2022), Technical Specification, 3rd Generation Partnership Project; Technical Specification Group Radio Access Network; NR; Radio Resource Control (RRC) protocol specification (Release 17), Dec. 2022, 1318 pages.

3GPP TS 38.331 V17.4.0 (Mar. 2023), Technical Specification, 3rd Generation Partnership Project; Technical Specification Group Radio Access Network; NR; Radio Resource Control (RRC) protocol specification (Release 17), Mar. 2023, 1324 pages.

3GPP TS 38.331 V17.6.0 (Sep. 2023), Technical Specification, 3rd Generation Partnership Project; Technical Specification Group Radio Access Network; NR; Radio Resource Control (RRC) protocol specification (Release 17), Sep. 2023, 1337 pages.

* cited by examiner

[Fig. 1]
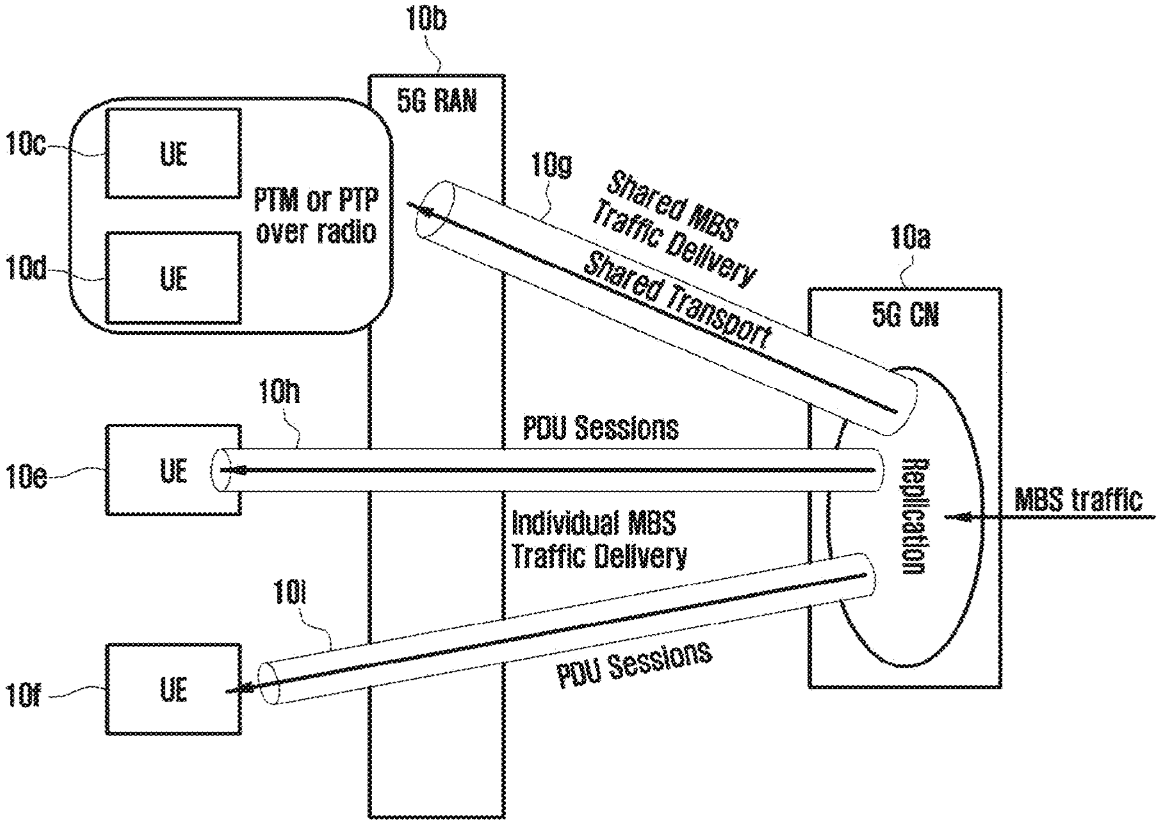

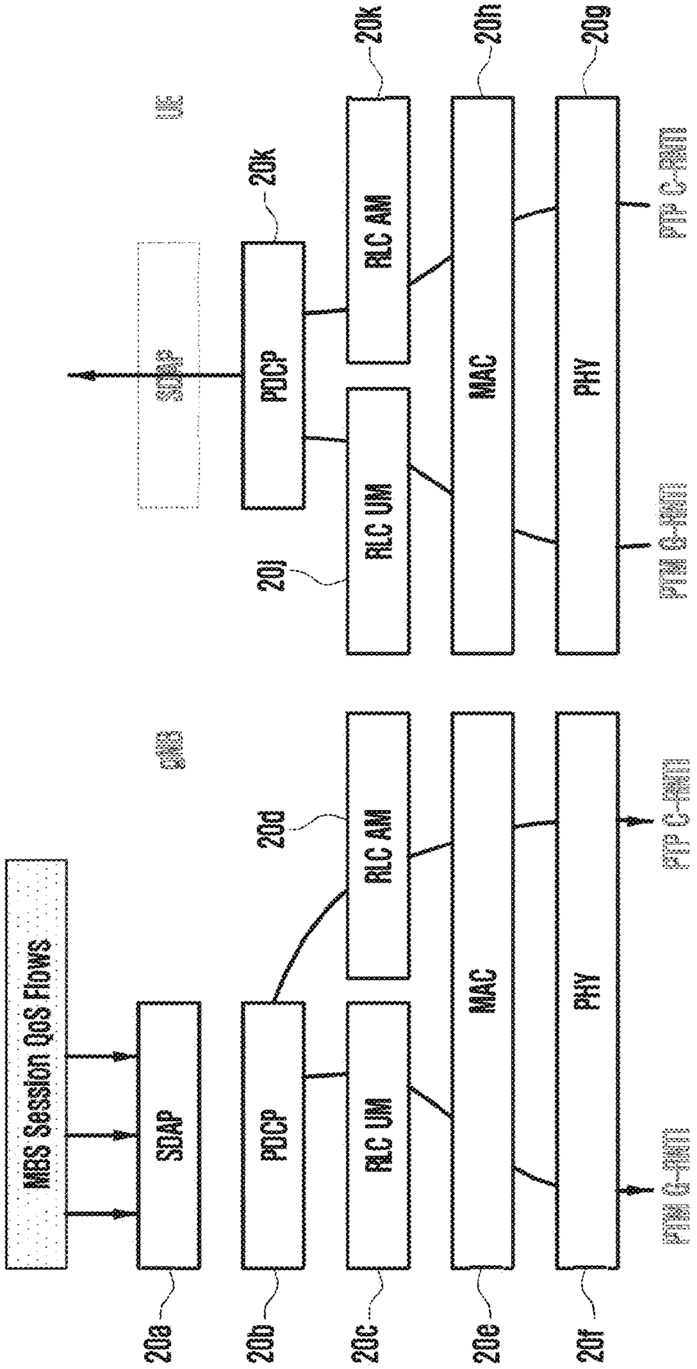
[Fig. 2]

[Fig. 3]
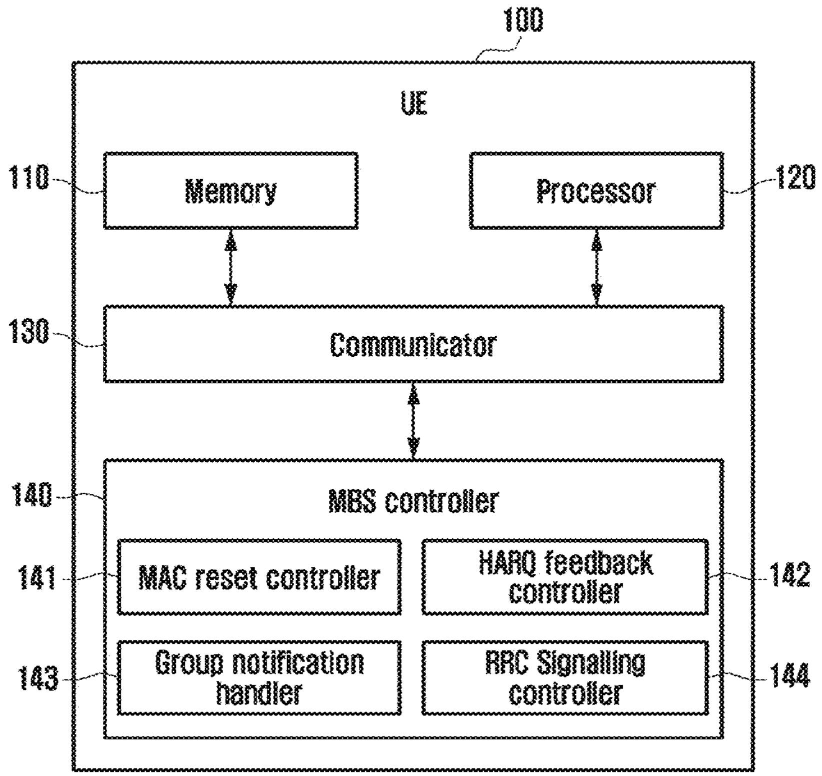

[Fig. 4]
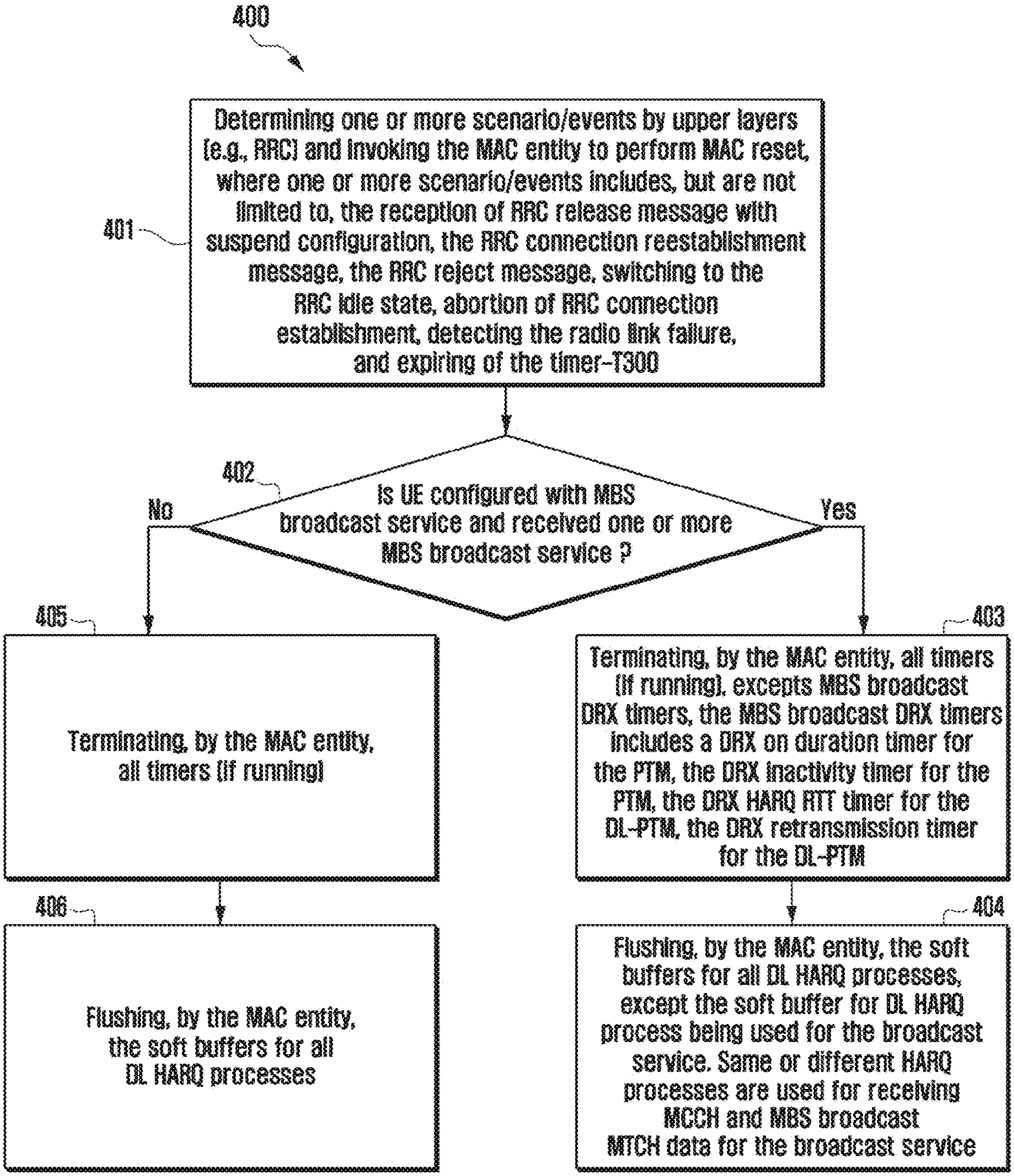

[Fig. 5a]
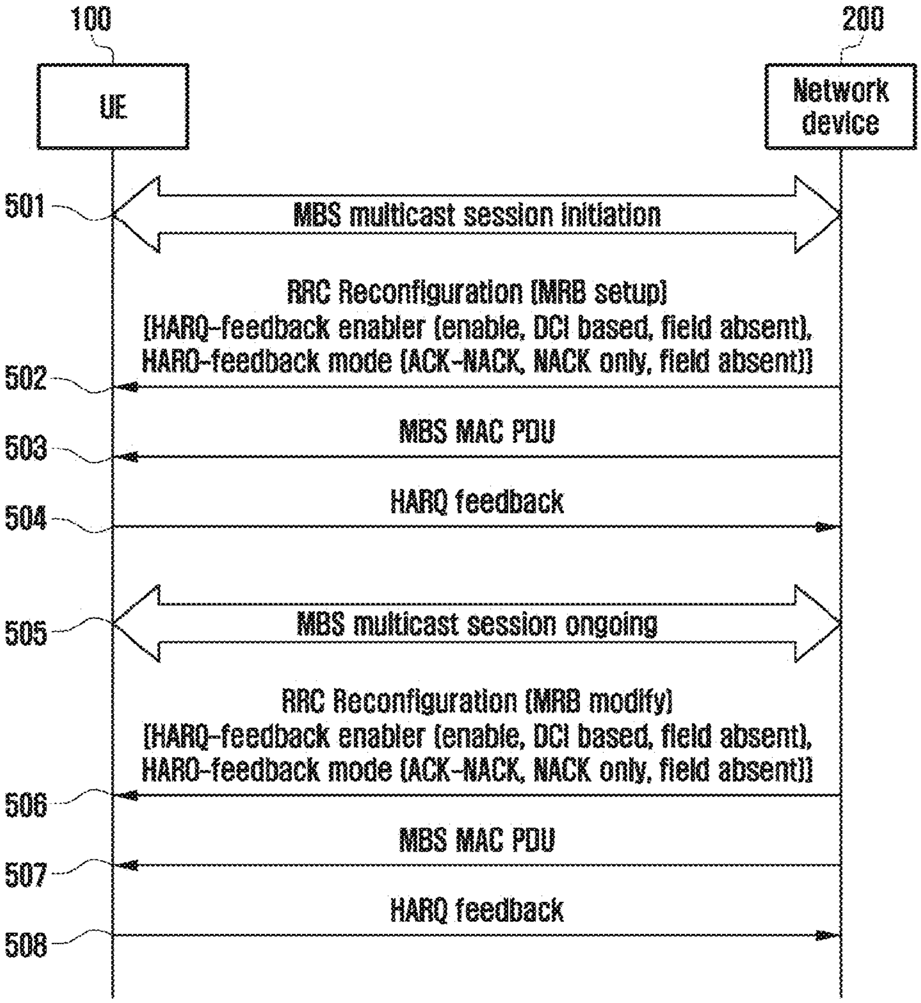

[Fig. 5b]
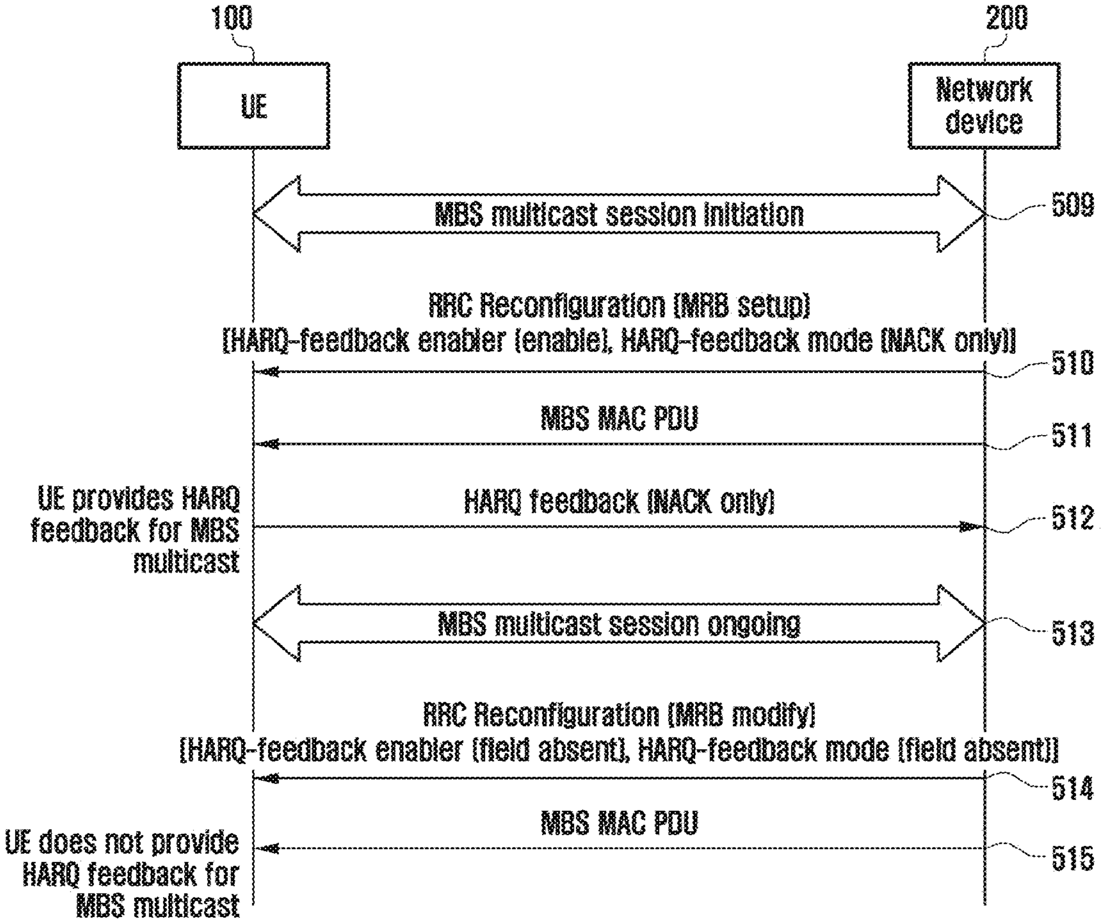

[Fig. 5c]
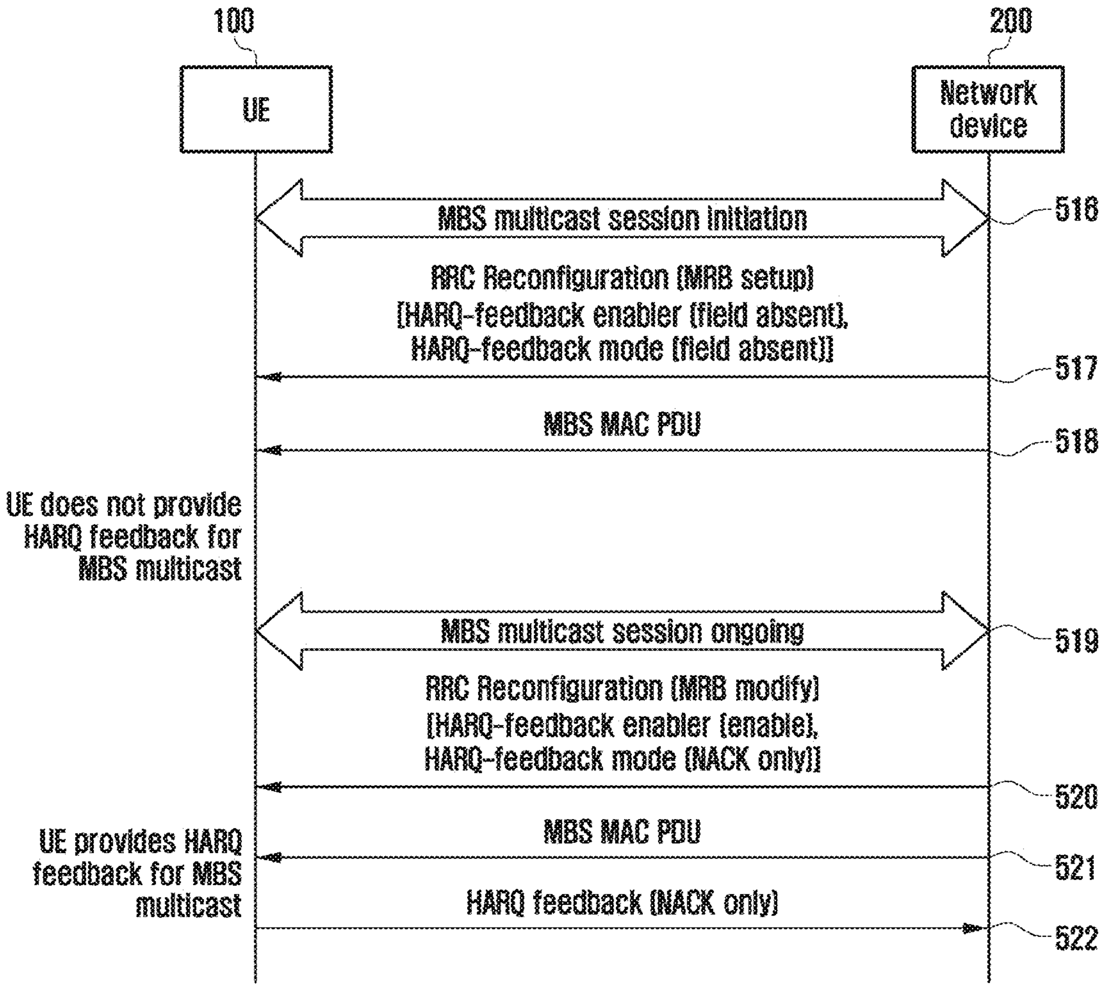

[Fig. 5d]
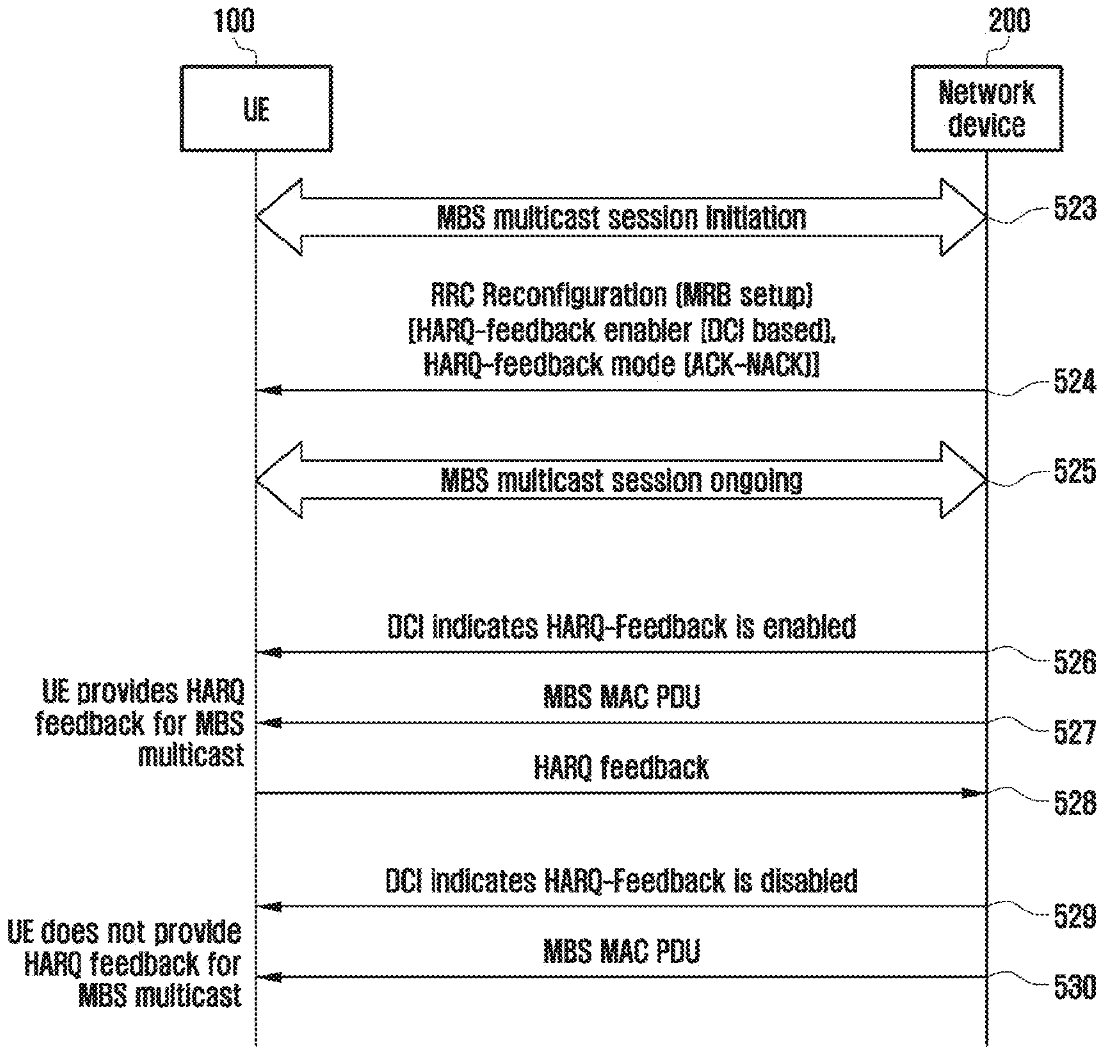

[Fig. 6]
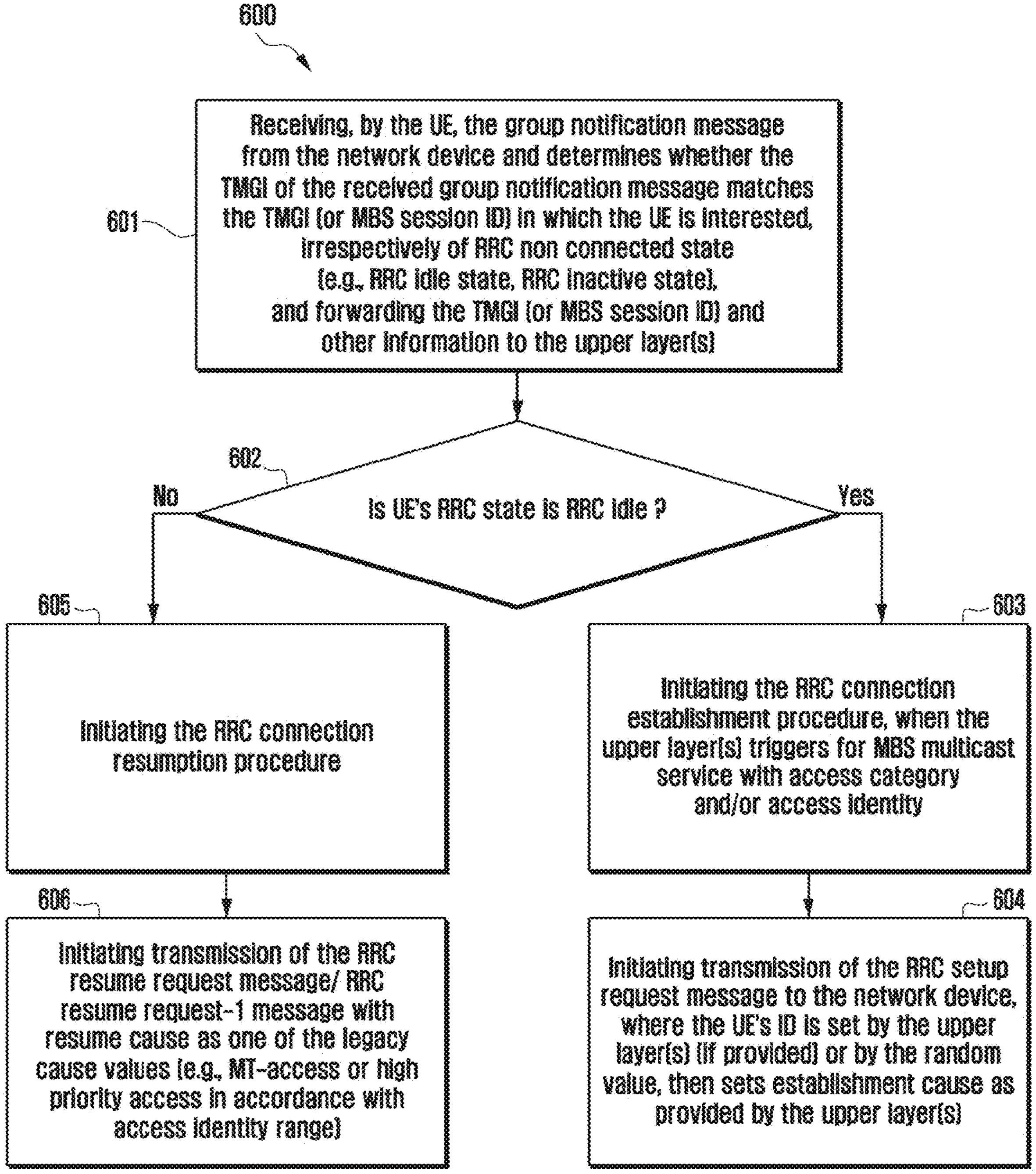

[Fig. 7]
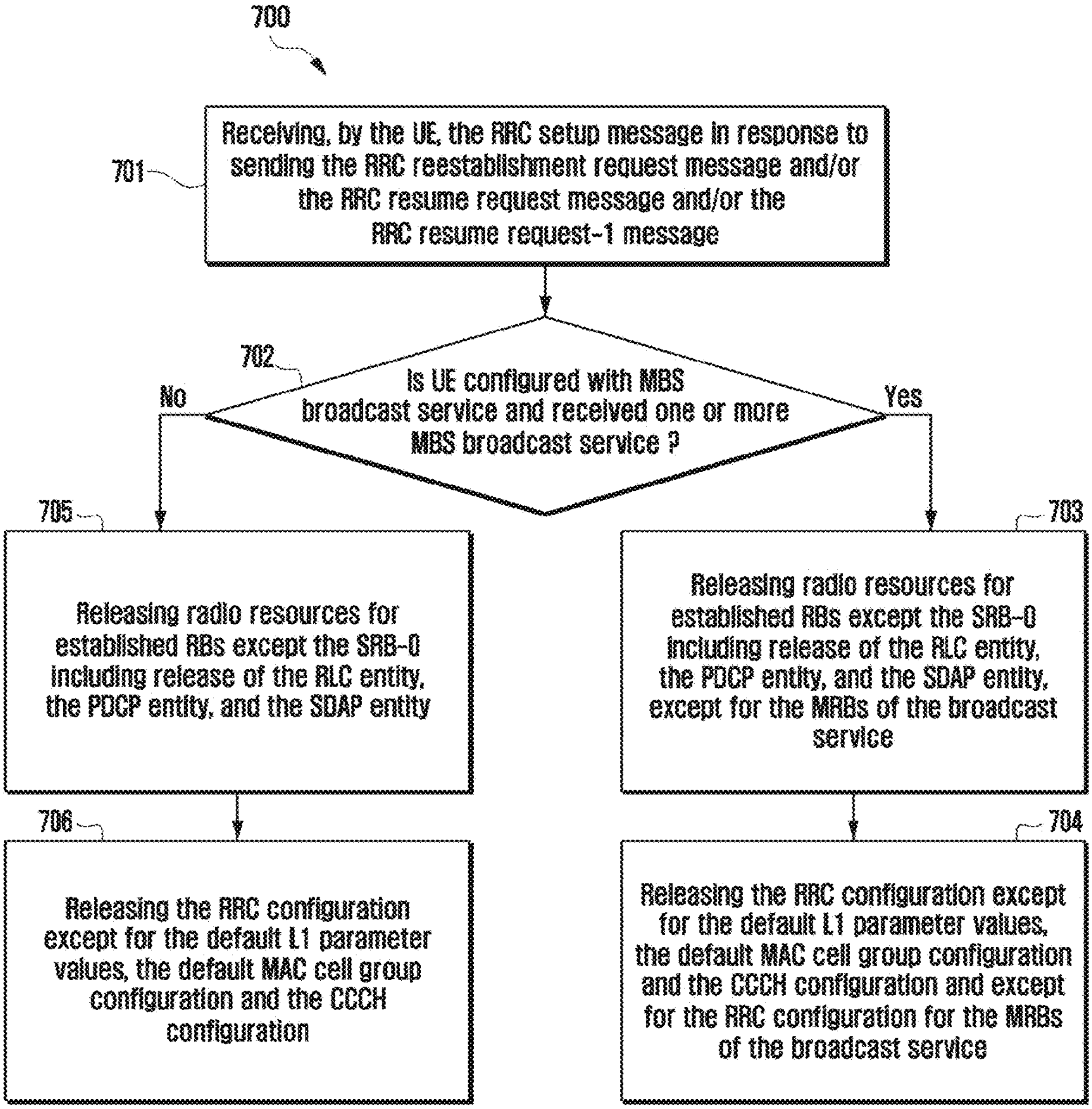

[Fig. 8]
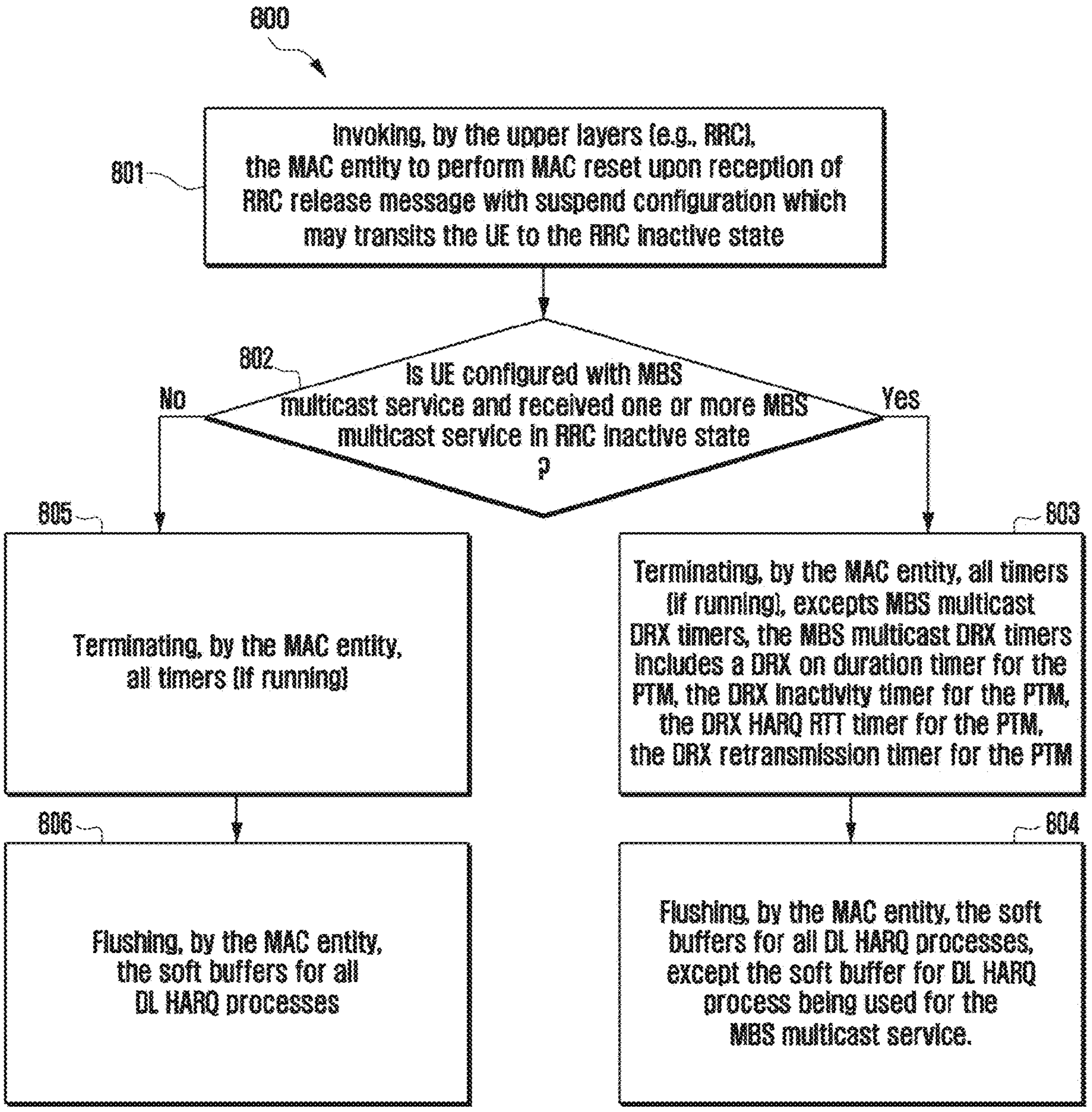

METHOD AND UE FOR MEDIUM ACCESS CONTROL (MAC) RESET AND OTHER RRC PROCEDURES IN NR MBS COMMUNICATION

TECHNICAL FIELD

The present invention relates to wireless communication, and more specifically related to a method and a User Equipment (UE) for a Medium Access Control (MAC) reset and other Radio Resource Control (RRC) procedures in a New Radio (NR) Multicast Broadcast Service (MBS) communication.

BACKGROUND ART 5G mobile communication technologies define broad frequency bands such that high transmission rates and new services are possible, and can be implemented not only in “Sub 6 GHz” bands such as 3.5 GHZ, but also in “Above 6 GHz” bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (cMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

In general, a New Radio (NR) Multicast Broadcast Service (MBS) communication offers both multicast and broadcast services. The multicast services in which a network (e.g., 5th Generation (5G) Core Network (CN)) transfers common user data (e.g., MBS user data) that is intended only for a specific group of UEs that have joined a concerned multicast group. The broadcast services in which the network transfers common user data that can be received by all UEs that are interested in receiving a service. MBS services may be provided by the network in a limited area of the network, and the coverage area of the MBS services may be one cell or larger.

The 5G CN (10*a*) delivers the MBS user data to a 5G Radio Access Network (RAN) (10*b*) using an individual delivery (10*h* and 10*i*) and/or shared delivery (10*g*) as illustrated in FIG. 1.

a. Individual delivery (10*h* and 10*i*): Each UE (10*c* and 10*f*) receives the MBS service, and the 5G CN (10*a*) delivers separate copies of MBS user data packets to the 5G RAN (10*b*) (i.e. via per-UE Protocol Data Unit (PDU) sessions, alike in case of unicast delivery).

b. Shared delivery (10*g*): the 5G CN (10*a*) delivers a single copy of MBS user data to the 5G RAN (10*b*) (i.e. via a shared PDU session/tunnel), with RAN handling delivery to one or multiple UEs (10*c* and 10*d*).

In the case of the shared delivery (10*g*) by the 5G CN (10*a*), the 5G RAN (10*b*) delivers the MBS data to the UEs (10*c* and 10*d*) using either Point-to-Point delivery (PTP) or Point-to-Multipoint (PTM) delivery. Furthermore, at the UE (e.g., 10*c*, 10*d*, 10*c*, 10*f*, etc.), reception via an MBS radio bearer (MRB) can be supported using various protocol stacks, an example of the protocol stack for the MBS in the NR for a gNodeB (gNB) and the UE (e.g., 10*c*, 10*d*, 10*c*, 10*f*, etc.) is illustrated in FIG. 2. The protocol stack includes one or more a single/common Service Data Adaptation Protocol (SDAP) entity (20*a*), a single/common Packet Data Convergence Protocol (PDCP) entity (20*b* and 20*k*), a single PTM Radio link control (RLC) bearer (20*c*, 20*d*, 20*i* and 20*j*), a single PTP RLC bearer or a combination i.e. UE simultaneously configured with a PTM and a PTP RLC bearer (also referred to as PTM and PTP legs), a MAC entity (20*c* and 20*h*), and a Physical (PHY) entity (20*f* and 20*g*).

The 3$^{rd}$ Generation Partnership Project (3GPP) is currently studying and working on existing NR MBS communication. However, it is currently unclear how to perform actions such as a MAC reset procedure and other Radio Resource Control (RRC) signalling and procedures related to the NR MBS communication, such as an RRC state transition, dedicated RRC signalling, paging (group paging), a Unified Access Control (UAC) signalling and procedure, UE assistance information for MBS, a Conditional Hand-Over (CHO) for MBS, and UE capability signalling.

Existing MAC reset procedure may have an impact on both ongoing broadcast and multicast service reception performance. At the MAC reset, Discontinuous Reception (DRX) timers are initialized and Hybrid Automatic Repeat Request (HARQ) processes/buffers for the MBS would be cleared, resulting in severe loss of MBS service packets and a degraded user experience. Furthermore, the existing HARQ feedback procedure needs to be flexible for MBS reception in light of service requirements and resource utilization (e.g. PUCCH resources). More specifically, air interface signalling for flexible UE configuration for HARQ feedback is lacking. Furthermore, there is no group paging handling procedure for a multicast session, and paging to the UEs relevant to multicast session activation is required.

Thus, it is desired to address the above-mentioned disadvantages or other shortcomings or at least provide a useful alternative for the MAC reset and other RRC procedures in the NR MBS communication.

DISCLOSURE OF INVENTION

Technical Problem

The principal object of the embodiments herein is to provide a method and a User Equipment (UE) for a Medium Access Control (MAC) reset and other Radio Resource Control (RRC) procedures in a New Radio (NR) Multicast Broadcast Service (MBS) communication. The method includes enhancing the MAC resetmechanism by considering a broadcast/multicast reception. Furthermore, the method includes providing a signalling mechanism for flexible configuration of a Hybrid Automatic Repeat Request (HARQ) feedback (i.e. HARQ feedback modes) for the MBS communication. Furthermore, the method includes providing a group paging reception and handling procedure for the MBS communication. As a result, a user experience is enhanced with uninterrupted and lossless performance for the MBS communication.

Solution to Problem

Accordingly, the embodiment herein is to provide a method for enhancing Medium Access Control (MAC) reset mechanism in a Multicast and broadcast service (MBS) communication. The method includes receiving, by a User Equipment (UE), a service from a network device, where the service includes an MBS multicast service and an MBS broadcast service. Furthermore, the method includes receiving, by the UE, a plurality of network messages from the network device. Furthermore, the method includes determining, by the UE, a plurality of events associated with the UE. Furthermore, the method includes performing, by the UE, the MAC reset mechanism in the MBS communication based on the service and/or the plurality of network messages, and/or the plurality of events.

In an embodiment, the plurality of network messages includes, one or more, a reception of Radio Resource Control (RRC) release message with suspend configuration, Radio Resource Control (RRC) release message, an RRC connection reestablishment message, an RRC reconfiguration with sync message and an RRC reject message.

In an embodiment, the plurality of events includes, one or more, switching of UE to an RRC idle state, an abortion of RRC connection establishment, detecting a radio link failure, and expiry of a timer-T300.

In an embodiment, where performing, by the UE, the MAC reset mechanism in the MBS communication based on the service determining, by the UE, whether the UE is configured with the MBS broadcast service and receiving the MBS broadcast service from the network device; performing, by one or more MAC entity of the UE, one of, terminating all running timers except MBS broadcast Discontinuous Reception (DRX) timers in response to determining that the UE is configured with the MBS broadcast service and receiving the MBS broadcast service from the network device, and flushing all soft buffers for all Downlink (DL) Hybrid Automatic Repeat Request (HARQ) processes except a soft buffer for DL HARQ process being used for the MBS broadcast service; or terminating all running timers in response to determining that the UE is not configured with the MBS broadcast service and not receiving the MBS broadcast service from the network device, and flushing all soft buffers for one or more DL HARQ processes; and enhancing, by the UE, the MAC reset mechanism based on terminating all running timers except MBS broadcast DRX timers and flushing all soft buffers for one or moreDL HARQ processes except the soft buffer for DL HARQ process being used for the MBS broadcast service, or terminating all running timers and flushing all soft buffers for one or moreDL HARQ processes.

In an embodiment, the MBS broadcast DRX timers includes, one or more, a DRX on-duration timer for a Point-to-Multipoint (PTM), a DRX inactivity timer for the PTM, a DRX HARQ Round-Trip-Time (RTT) timer for the PTM, a DRX retransmission timer for the PTM.

In an embodiment, one or more DL HARQ processes are used for receiving MBS Control Channel (MCCH) and MBS Traffic Channel (MTCH) data for the MBS broadcast service.

In an embodiment, the method includes considering, by the UE, a next received transmission for a Transport Block (TB) as a first transmission for one or more DL HARQ processes, except for the DL HARQ process being used for the MBS broadcast service to enhance the MAC reset mechanism; or considering, by the UE, the next received transmission for the TB as the first transmission for all DL HARQ processes to enhance the MAC reset mechanism.

In an embodiment, where performing, by the UE, the MAC reset mechanism in the MBS communication based on the service includes determining, by the UE, whether the UE is configured to receive the MBS multicast service in RRC inactive state or receiving the MBS multicast service in RRC inactive state from the network device, where the UE is transitioning to RRC inactive state or is in a Radio Resource Control (RRC) inactive state; performing, by one or more MAC entity of the UE, one of, terminating all running timers except MBS multicast DRX timers in response to determining that the UE is configured to receive the MBS multicast service in RRC inactive state or receiving the MBS multicast service in RRC inactive state from the network device, and flushing all soft buffers for all DL HARQ processes except the soft buffer for DL HARQ process is for the MBS multicast service in RRC inactive state; or terminating all running timers in response to determining that the UE is not configured to receive the MBS multicast service in RRC inactive state or not receiving the MBS multicast service in RRC inactive state from the network device, and flushing all soft buffers for all DL HARQ processes; and enhancing, by the UE, the MAC reset mechanism based on the terminating all running timers except MBS multicast DRX timers and flushing all soft buffers for one or moreDL HARQ processes except the soft buffer for DL HARQ process for the MBS multicast service in RRC inactive state, or terminating all running timers and flushing all soft buffers for one or moreDL HARQ processes.

In an embodiment, the MBS multicast DRX timers includes, one or more, a DRX on-duration timer for a Point-to-Multipoint (PTM), a DRX inactivity timer for the PTM, a DRX HARQ Round-Trip-Time (RTT) timer for the PTM, a DRX retransmission timer for the PTM.

In an embodiment, the method includes considering, by the UE, the next received transmission for the TB as the first transmission for one or more DL HARQ processes, except for the DL HARQ process being used for the MBS multicast service to enhance the MAC reset mechanism; or considering, by the UE, the next received transmission for the TB as the first transmission for all DL HARQ processes to enhance the MAC reset mechanism.

Accordingly, the embodiment herein is to provide a method for configuring a Hybrid Automatic Repeat Request (HARQ) feedback mechanism in the Multicast and broadcast service (MBS) communication. The method includes receiving, by the UE, the service from the network device, where the service includes the MBS multicast service and the MBS broadcast service. Furthermore, the method includes establishing, by the UE, a session with the network device for the received service. Furthermore, the method includes receiving, by the UE, a Radio Resource Control (RRC) reconfiguration message along with a HARQ parameter for the MBS from the network device. Furthermore, the method includes configuring, by the UE, the UE based on the received HARQ parameter for the MBS. Furthermore, the method includes receiving, by the UE, a MBS packet(s) from the network device. Furthermore, the method includes sending, by the UE, a HARQ feedback message for the received MBS packet to the network device based on the configuration.

In an embodiment, the HARQ parameter for the MBS includes a HARQ feedback mode information and/or HARQ feedback enabler information.

In an embodiment, the HARQ feedback mode information includes one or more a combination of Acknowledgement (ACK) and Negative Acknowledgement (NACK), a NACK only, and an absence of the HARQ feedback mode field.

In an embodiment, the HARQ feedback enabler information includes, one or more, an enable option for the HARQ feedback message, a Downlink Control Indication (DCI) based enabler option for the HARQ feedback message wherein received DCI to indicate an enable or disable value, and an absence of the HARQ feedback enabler field.

In an embodiment, where sending, by the UE, the HARQ feedback message for received MBS packet to the network device based on the configuration includes one of, determining, by the UE, whether the HARQ feedback mode information includes one or more the combination of ACK and NACK and the NACK only, and the HARQ feedback enabler information includes one or more, the enable option for the HARQ feedback message and the DCI based enabler option for the HARQ feedback message where received DCI indicates the enable value; sending, by the UE, the HARQ feedback message for received MBS packet to the network device in response to determining that the HARQ feedback mode information includes, one or more, the combination of ACK and NACK and the NACK only, and the HARQ feedback enabler information includes, one or more, the enable option for the HARQ feedback message and the DCI based enabler option for the HARQ feedback message where received DCI indicates the enable value; or skipping, by the UE, sending of the HARQ feedback message for received MBS packet to the network device in response to determining that the HARQ feedback enabler information includes, one or more, an absence of the HARQ feedback enabler field and the DCI based enabler option for HARQ feedback message where received DCI indicates a disable value.

Accordingly, the embodiment herein is to provide a method for handling a group notification message to initiate a Radio Resource Control (RRC) procedure in the MBS communication. The method includes receiving, by the UE, the group notification message from the network device, where the group notification message includes a first Identity (ID); detecting, by the UE, a second ID for the UE, where the second ID is allocated by a upper layer or the second ID is determined based on an MBS multicast service in which UE is interested; determining, by the UE, whether the first ID matches with the second ID; sending, by the UE, the first ID and other information to the upper layer, where the other information includes an identity of the UE, an access type or any future addition of status or information in a paging message; determining, by the UE, whether the UE is in an RRC idle state or an RRC inactive state; performing, by the UE, one of, initiating an RRC connection establishment procedure, upon a request from the upper layer, in response to determining that the UE is in the RRC idle state and initiating transmission of an RRC setup request message to the network device; or initiating an RRC connection resumption procedure in response to determining that the UE is in the RRC inactive state and initiating transmission of an RRC resume request message to the network device. Transmission of RRC setup request or RRC resume request may be in accordance to the access category or access identity. The access category and/or access identity are, for example, can be configured by an operator to control access attempt by the UE to the network device. E.g. the access identity means the UE is configured for mission critical service. The access category implies a combination of conditions related to the UE and the type of access attempt e.g. access category-1 means the UE is configured for delay tolerant service and subject to access control. Access attempt for all except emergency is controlled.

In an embodiment, the group notification message includes, one or more, a paging message, a group paging message, a MBS Control Channel (MCCH) change notification message, a System Information Block (SIB) message and an MCCH message.

Accordingly, the embodiment herein is to provide a method for performing an action upon reception of a Radio Resource Control (RRC) setup message in the MBS communication. The method includes sending, by the UE, a Radio Resource Control (RRC) reestablishment request message and/or an RRC resume request message to the network device. Furthermore, the method includes receiving, by the UE, the RRC setup message in response to sending the RRC reestablishment request message and/or the RRC resume request message. Furthermore, the method includes determining, by the UE, whether the UE is configured with the MBS broadcast service and/or receiving the MBS broadcast service from the network device. Furthermore, the method includes performing, by the UE, one of, releasing an RRC configuration except for default Layer 1 (L1) parameter values, default Medium Access Control (MAC) cell group configuration and Common Control Channel (CCCH) configuration, and except for the RRC configuration for MBS Radio Bearers (MRBs) of the MBS broadcast service in response to determining the UE is configured with the MBS broadcast service and receiving the MBS broadcast service from the network device; or releasing the RRC configuration except for the default L1 parameter values, the default MAC cell group configuration and the CCCH configuration in response to determining the UE is not configured with the MBS broadcast service and not receiving the MBS broadcast service from the network device.

In an embodiment, the method includes releasing, by the UE, radio resources for established Radio Bearers (RBs) except Signalling Radio Bearer-0 (SRB-0) including release of, one or more, a Radio link control (RLC) entity, a Packet Data Convergence Protocol (PDCP) entity, and a Service Data Adaption Protocol (SDAP) entity, except for the MRBs of the MBS broadcast service.

In an embodiment, the method includes releasing, by the UE, radio resources for established Radio Bearers (RBs) except Signalling Radio Bearer-0 (SRB-0) including release of, one or more, a Radio link control (RLC) entity, a Packet Data Convergence Protocol (PDCP) entity, and a Service Data Adaption Protocol (SDAP) entity.

Accordingly, the embodiment herein is to provide the UE for enhancing the MAC reset mechanism in the MBS communication. The UE includes an MBS controllercoupled with a processor and a memory. The MBS controller receives the service from the network device, where the service includes the MBS multicast service and the MBS broadcast service. Furthermore, the MBS controller receives the plurality of network messages from the network device. Furthermore, the MBS controller determines the plurality of events associated with the UE. Furthermore, the MBS controller performs the MAC reset mechanism in the MBS communication based the service and/or the plurality of network messages, and/or the plurality of events.

Accordingly, the embodiment herein is to provide the UE for configuring the HARQ feedback mechanism in the MBS communication. The UE includes the MBS controller coupled with the processor and the memory. The MBS controller receives the service from the network device, where the service includes the MBS multicast service and the MBS broadcast service. Furthermore, the MBS controller establishes the session with the network device for the received service. Furthermore, the MBS controller receives the RRC reconfiguration message along with the HARQ parameter for MBS from the network device. Furthermore, the MBS controller configures the UE based on the received HARQ parameter for the MBS. Furthermore, the MBS controller receives the MBS packet(s) from the network device. Furthermore, the MBS controller sends the HARQ feedback message for the received MBS packet to the network device based on the configuration.

Accordingly, the embodiment herein is to provide the UE for handling the group notification message to initiate the RRC procedure in the MBS communication. The UE includes the MBS controller coupled with the processor and the memory. The MBS controller receives the group notification message from the network device, where the group notification message includes the first Identity (ID). Furthermore, the MBS controller detects the second ID for the UE, wherein the second ID is allocated by the upper layer or the second ID is determined based on the MBS multicast service in which UE is interested. Furthermore, the MBS controller determines whether the first ID matches with the second ID. Furthermore, the MBS controller sends the first ID and other information to the upper layer, where the other information includes the identity of the UE, the access type or any future addition of status or information in the paging message. Furthermore, the MBS controller performs one of, initiates the RRC connection establishment procedure, upon the request from the upper layer, in response to determining that the UE is in the RRC idle state and initiating transmission of the RRC setup request message to the network device; or initiates the RRC connection resumption procedure in response to determining that the UE is in the RRC inactive state and initiating transmission of the RRC resume request message to the network device. Transmission of RRC setup request or RRC resume request may be in accordance to the access category or access identity.

Accordingly, the embodiment herein is to provide the UE for performing the action upon reception of the RRC setup message in the MBS communication. The UE includes the MBS controller coupled with the processor and the memory. The MBS controller sends the RRC reestablishment request message and/or the RRC resume request message to the network device. Furthermore, the MBS controller receives the RRC setup message in response to sending the RRC reestablishment request message and/or the RRC resume request message. Furthermore, the MBS controller determines whether the UE is configured with the MBS broadcast service and receiving the MBS broadcast service from the network device. Furthermore, the MBS controller performs one of, releases the RRC configuration except for the default L1 parameter values, the default MAC cell group configuration and the CCCH configuration, and except for the RRC configuration for the MRBs of the MBS broadcast service in response to determining the UE is configured with the MBS broadcast service and receiving the MBS broadcast service from the network device; or releases the RRC configuration except for the default L1 parameter values, the default MAC cell group configuration and the CCCH configuration in response to determining the UE is not configured with the MBS broadcast service and not receiving the MBS broadcast service from the network device. Furthermore, the MBS controller performs one of, releases radio resources for established Radio Bearers (RBs) except Signalling Radio Bearer-0 (SRB-0) including release of, one or more, a Radio link control (RLC) entity, a Packet Data Convergence Protocol (PDCP) entity, and a Service Data Adaption Protocol (SDAP) entity, except for the MRBs of the MBS broadcast service in response to determining the UE is configured with the MBS broadcast service and receiving the MBS broadcast service from the network device; or releases radio resources for established (RBs) except the SRB-0 including release of one or more, the RLC entity, the PDCP entity, and the SDAP entity, in response to determining the UE is not configured with the MBS broadcast service and not receiving the MBS broadcast service from the network device.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein, and the embodiments herein include all such modifications.

Advantageous Effects of Invention

According to an embodiment of present disclosure a method and a system for enhancing a Medium Access Control (MAC) resetmechanism by considering a broadcast/multicast reception is provided.

BRIEF DESCRIPTION OF DRAWINGS

This invention is illustrated in the accompanying drawings, throughout which like reference letters indicate corresponding parts in the various figures. The embodiments herein will be better understood from the following description with reference to the drawings, in which:

FIG. 1 illustratesaMulticast Broadcast Service (MBS) delivery from a 5th Generation (5G) Core Network (CN) to a 5G Radio Access Network (RAN) and one or more User Equipment (UEs);

FIG. 2 illustrates aprotocol stack for the MBS in a New Radio (NR);

FIG. 3 illustrates a block diagram of a User Equipment (UE) for enhancing a Medium Access Control (MAC) reset and other Radio Resource Control (RRC) procedures in an NR MBS communication, according to an embodiment as disclosed herein;

FIG. 4 is a flow diagram illustrating a method for enhancing the MAC reset in the NR MBS communication, according to an embodiment as disclosed herein;

FIG. 5A is a sequence diagram illustrating a Hybrid Automatic Repeat Request (HARQ) feedback mechanism in the MBS communication, according to an embodiment as disclosed herein;

FIG. 5B is a sequence diagram illustrating a Hybrid Automatic Repeat Request (HARQ) feedback mechanism in the MBS communication, according to an embodiment as disclosed herein;

FIG. 5C is a sequence diagram illustrating a Hybrid Automatic Repeat Request (HARQ) feedback mechanism in the MBS communication, according to an embodiment as disclosed herein;

FIG. 5D is a sequence diagram illustrating a Hybrid Automatic Repeat Request (HARQ) feedback mechanism in the MBS communication, according to an embodiment as disclosed herein;

FIG. 6 is a flow diagram illustrating a method for handling a group notification message to initiate the RRC procedure in the MBS communication, according to an embodiment as disclosed herein;

FIG. 7 is a flow diagram illustrating a method for performing an action(s) upon reception of an RRC setup message in the MBS communication, according to an embodiment as disclosed herein; and FIG. 8 is a flow diagram illustrating a method for enhancing the MAC reset in the NR MBS communication, according to another embodiment as disclosed herein.

MODE FOR THE INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware componentsor the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help casily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Throughout this disclosure, the terms "broadcast service" and "MBS broadcast service" are used interchangeably and mean the same. The terms "multicast service" and "MBS multicast service" are used interchangeably and mean the same.

Accordingly, the embodiment herein is to provide a method for enhancing Medium Access Control (MAC) reset mechanism in a Multicast and broadcast service (MBS) communication. The method includes receiving, by a User Equipment (UE), a service from a network device, where the service includes an MBS multicast service and an MBS broadcast service. Furthermore, the method includes receiving, by the UE, a plurality of network messages from the network device. Furthermore, the method includes determining, by the UE, a plurality of events associated with the UE. Furthermore, the method includes performing, by the UE, the MAC reset mechanism in the MBS communication based on the service and/or the plurality of network messages, and/or the plurality of events.

Accordingly, the embodiment herein is to provide a method for configuring a Hybrid Automatic Repeat Request (HARQ) feedback mechanism in the MBS communication. The method includes receiving, by the UE, the service from the network device, where the service includes the MBS multicast service and the MBS broadcast service. Furthermore, the method includes establishing, by the UE, a session with the network device for the received service. Furthermore, the method includes receiving, by the UE, a Radio Resource Control (RRC) reconfiguration message along with a HARQ parameter for the MBS from the network device. Furthermore, the method includes configuring, by the UE, the UE based on the received HARQ parameter for the MBS. Furthermore, the method includes receiving, by the UE, a MBS packet(s) from the network device. Furthermore, the method includes sending, by the UE, a HARQ feedback message for the received MBS packet to the network device based on the configuration.

Accordingly, the embodiment herein is to provide a method for handling a group notification message to initiate a Radio Resource Control (RRC) procedure in the MBS communication. The method includes receiving, by the UE, the group notification message from the network device, where the group notification message includes a first Identity (ID); detecting, by the UE, a second ID for the UE, where the second ID is allocated by a upper layer or the second ID is determined based on an MBS multicast service in which UE is interested; determining, by the UE, whether the first ID matches with the second ID; sending, by the UE, the first ID and other information to the upper layer, where the other information includes an identity of the UE, an access type or any future addition of status or information in a paging message; determining, by the UE, whether the UE is in an RRC idle state or an RRC inactive state; performing, by the UE, one of, initiating an RRC connection establishment procedure, upon a request from the upper layer, in response to determining that the UE is in the RRC idle state and initiating transmission of an RRC setup request message to the network device; or initiating an RRC connection resumption procedure in response to determining that the UE is in the RRC inactive state and initiating transmission of an RRC resume request message to the network device. Transmission of RRC setup request or RRC resume request may be in accordance to the access category or access identity.

Accordingly, the embodiment herein is to provide a method for performing an action upon reception of a Radio Resource Control (RRC) setup message in the MBS communication. The method includes sending, by the UE, a Radio Resource Control (RRC) reestablishment request message and/or an RRC resume request message to the network device. Furthermore, the method includes receiving, by the UE, the RRC setup message in response to sending the RRC reestablishment request message and/or the RRC resume request message. Furthermore, the method includes determining, by the UE, whether the UE is configured with the MBS broadcast service and/or receiving the MBS broadcast service from the network device. Furthermore, the method includes performing, by the UE, one of, releasing an RRC configuration except for default Layer 1 (L1) parameter values, default Medium Access Control (MAC) cell group configuration and Common Control Channel (CCCH) configuration, and except for the RRC configuration for MBS Radio Bearers (MRBs) of the MBS broadcast service in response to determining the UE is configured with the MBS broadcast service and receiving the MBS broadcast service from the network device; or releasing the RRC configuration except for the default L1 parameter values, the default MAC cell group configuration and the CCCH configuration in response to determining the UE is not configured with the MBS broadcast service and not receiving the MBS broadcast service from the network device. Furthermore, the method includes performing, by the UE, one of, releasing radio resources for established Radio Bearers (RBs) except Signalling Radio Bearer-0 (SRB-0) including release of, one or more, a Radio link control (RLC) entity, a Packet Data Convergence Protocol (PDCP) entity, and a Service Data Adaption Protocol (SDAP) entity, except for the MRBs of the MBS broadcast service in response to determining the UE is configured with the MBS broadcast service and receiving the MBS broadcast service from the network device; or releasing radio resources for established (RBs) except the SRB-0 including release of one or more, the RLC entity, the PDCP entity, and the SDAP entity, in response to determining the UE is not configured with the MBS broadcast service and not receiving the MBS broadcast service from the network device.

Accordingly, the embodiment herein is to provide the UE for enhancing the MAC reset mechanism in the MBS communication. The UE includes an MBS controller coupled with a processor and a memory. The MBS controller receives the service from the network device, where the service includes the MBS multicast service and the MBS broadcast service. Furthermore, the MBS controller receives the plurality of network messages from the network device. Furthermore, the MBS controller determines the plurality of events associated with the UE. Furthermore, the MBS controller performs the MAC reset mechanism in the MBS communication based the service and/or the plurality of network messages, and/or the plurality of events.

Accordingly, the embodiment herein is to provide the UE for configuring the HARQ feedback mechanism in the MBS communication. The UE includes the MBS controller coupled with the processor and the memory. The MBS controller receives the service from the network device, where the service includes the MBS multicast service and the MBS broadcast service. Furthermore, the MBS controller establishes the session with the network device for the received service. Furthermore, the MBS controller receives the RRC reconfiguration message along with the HARQ parameter for MBS from the network device. Furthermore, the MBS controller configures the UE based on the received HARQ parameter for the MBS. Furthermore, the MBS controller receives the MBS packet(s) from the network device. Furthermore, the MBS controller sends the HARQ feedback message for the received MBS packet to the network device based on the configuration.

Accordingly, the embodiment herein is to provide the UE for handling the group notification message to initiate the RRC procedure in the MBS communication. The UE includes the MBS controller coupled with the processor and the memory. The MBS controller receives the group notification message from the network device, where the group notification message includes the first Identity (ID). Furthermore, the MBS controller detects the second ID for the UE, wherein the second ID is allocated by the upper layer or the second ID is determined based on the MBS multicast service in which UE is interested. Furthermore, the MBS controller determines whether the first ID matches with the second ID. Furthermore, the MBS controller sends the first ID and other information to the upper layer, where the other information includes the identity of the UE, the access type or any future addition of status or information in the paging message. Furthermore, the MBS controller performs one of, initiates the RRC connection establishment procedure, upon the request from the upper layer, in response to determining that the UE is in the RRC idle state and initiating transmission of the RRC setup request message to the network device; or initiates the RRC connection resumption procedure in response to determining that the UE is in the RRC inactive state and initiating transmission of the RRC resume request message to the network device. Transmission of RRC setup request or RRC resume request may be in accordance to the access category or access identity.

Accordingly, the embodiment herein is to provide the UE for performing the action upon reception of the RRC setup message in the MBS communication. The UE includes the MBS controller coupled with the processor and the memory. The MBS controller sends the RRC reestablishment request message and/or the RRC resume request message to the network device. Furthermore, the MBS controller receives the RRC setup message in response to sending the RRC reestablishment request message and/or the RRC resume request message. Furthermore, the MBS controller determines whether the UE is configured with the MBS broadcast service and receiving the MBS broadcast service from the network device. Furthermore, the MBS controller performs one of, releases the RRC configuration except for the default L1 parameter values, the default MAC cell group configuration and the CCCH configuration, and except for the RRC configuration for the MRBs of the MBS broadcast service in response to determining the UE is configured with the MBS broadcast service and receiving the MBS broadcast service from the network device; or releases the RRC configuration except for the default L1 parameter values, the default MAC cell group configuration and the CCCH configuration in response to determining the UE is not configured with the MBS broadcast service and not receiving the MBS broadcast service from the network device. Furthermore, the MBS controller performs one of, releases radio resources for the established RBs except theSRB-0 including release of, one or more, the RLC entity, the PDCP entity, and the SDAP entity, except for the MRBs of the MBS broadcast service in response to determining the UE is configured with the MBS broadcast service and receiving the MBS broadcast service from the network device; or releases radio resources for the established (RBs) except the SRB-0 including release of one or more, the RLC entity, the PDCP entity, and the SDAP entity, in response to determining the UE is not configured with the MBS broadcast service and not receiving the MBS broadcast service from the network device.

Unlike existing methods and systems, the proposed method enhances the MAC resetmechanism considering broadcast/multicast reception. Furthermore, the proposed method provides a signalling mechanism for flexible configuration of a Hybrid Automatic Repeat Request (HARQ) feedback (i.e. HARQ feedback modes) for the MBS communication. Furthermore, the proposed method provides a group paging reception and handling procedure for the MBS communication. As a result, a user experience is enhanced with uninterrupted and lossless performance for the MBS communication.

Referring now to the drawings and more particularly to FIGS. 3 through 8, where similar reference characters denote corresponding features consistently throughout the figures, there are shown preferred embodiments.

FIG. 3 illustrates a block diagram of a User Equipment (UE) (100) for enhancing a Medium Access Control (MAC) reset and other Radio Resource Control (RRC) procedures in an NR MBS communication, according to an embodiment as disclosed herein. Examples of the UE (100) include, but not limited to a terminal, a mobile phone, a smartphone, a tablet computer, a Personal Digital Assistance (PDA), an Internet of Things (IoT) device, a wearable device, a Wireless Fidelity (Wi-Fi) router, a USB dongle, a television, a vehicle with communication facility (for example; a connected car), or any other processing device supporting the MBS services.

In an embodiment, the UE (100) includes a memory (110), a processor (120), a communicator (130), and an MBS controller (140).

In an embodiment, the memory (110) stores a plurality of network messages, a plurality of events associated with the UE (100), a service (e.g., an MBS multicast service, an MBS broadcast service, etc.), a Hybrid Automatic Repeat Request (HARQ) parameter, a first Identity (ID), a second ID, and various Radio Resource Control (RRC) signalling/message information. The memory (110) stores instructions to be executed by the processor (120). The memory (110) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (110) may, in some examples, be considered a non-transitory storage medium. The term "non-transitory" may indicate that the storage medium is not embodied in a carrier wave or a propagated signal. However, the term "non-transitory" should not be interpreted that the memory (110) is non-movable. In some examples, the memory (110) can be configured to store larger amounts of information than the memory. In certain examples, a non-transitory storage medium may store data that can, over time, change (e.g., in Random Access Memory (RAM) or cache). The memory (110) can be an internal storage unit or it can be an external storage unit of the UE (100), a cloud storage, or any other type of external storage.

The processor (120) communicates with the memory (110), the communicator (130), and the MBS controller (140). The processor (120) is configured to execute instructions stored in the memory (110) and to perform various processes. The processor (120) may include one or a plurality of processors, maybe a general-purpose processor, such as a controller, multiple homogeneous or heterogeneous cores, a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU). The processor (120) performs an operation of the UE (100) described a plurality of embodiment of the disclosure.

The communicator (130) is configured for communicating internally between internal hardware components and with external devices (e.g. eNodeB, gNodeB, server, etc.) via one or more networks (e.g. Radio technology). The communicator (130) includes an electronic circuit specific to a standard that enables wired or wireless communication.

The MBS controller (140) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In an embodiment, the MBS controller (140) includes an MAC reset controller (141), a HARQ feedback controller (142), a group notification handler (143), and an RRC signalling controller (144).

The MAC reset controller (141) receives the service from a network device (200) (e.g., server, cloud network, core network, base station, etc.), where the service includes the MBS multicast service and the MBS broadcast service. The MAC reset controller (141) receives the plurality of network messages from the network device (200). The plurality of network messages includes, one or more, a reception of Radio Resource Control (RRC) release message with suspend configuration, the RRC release message, an RRC connection reestablishment message, an RRC reconfiguration with a sync message and an RRC reject message. The MAC reset controller (141) determines a plurality of events associated with the UE (100). The plurality of events includes, one or more, switching of the UE (100) to an RRC idle state, an abortion of RRC connection establishment, detecting a radio link failure, and expiry of a timer-T300. The MAC reset controller (141) performs a MAC reset mechanism in the MBS communication based on the service and/or the plurality of network messages, and/or the plurality of events.

Furthermore, the MAC reset controller (141) determines whether the UE (100) is configured with the MBS broadcast service and/or receiving the MBS broadcast service from the network device (200). The MAC reset controller (141) terminates all running timers except MBS broadcast Discontinuous Reception (DRX) timers in response to determining that the UE (100) is configured with the MBS broadcast service and/or receiving the MBS broadcast service from the network device (200), and flushing all soft buffers for all Downlink (DL) Hybrid Automatic Repeat Request (HARQ) processes except a soft buffer for DL HARQ process being used for the MBS broadcast service or the MAC reset controller (141) terminating all running timers in response to determining that the UE (100) is not configured with the MBS broadcast service and not receiving the MBS broadcast service from the network device (200), and flushing all soft buffers for one or more DL HARQ processes. The MAC reset controller (141) enhances the MAC reset mechanism based on the terminating all running timers except MBS broadcast DRX timers and flushing all soft buffers for one or moreDL HARQ processes except the soft buffer for DL HARQ process being used for the MBS broadcast service, or terminating all running timers and flushing all soft buffers for one or moreDL HARQ processes.

The MBS broadcast DRX timers includes, one or more, a DRX on-duration timer for a Point-to-Multipoint (PTM), a DRX inactivity timer for the PTM, a DRX HARQ Round-Trip-Time (RTT) timer for the PTM, a DRX retransmission timer for the PTM. One or more DL HARQ processes are used for receiving MBS Control Channel (MCCH) and MBS Traffic Channel (MTCH) data for the MBS broadcast service.

Furthermore, the MAC reset controller (141) considers a next received transmission for a Transport Block (TB) as a first transmission for one or more DL HARQ processes, except for the DL HARQ process being used for the MBS broadcast service to enhance the MAC reset mechanism, or considers the next received transmission for the TB as the first transmission for all DL HARQ processes to enhance the MAC reset mechanism.

Furthermore, the MAC reset controller (141) determines whether the UE (100) is configured to receive the MBS multicast service in a Radio Resource Control (RRC) inactive state and/or receiving the MBS multicast service in RRC inactive state from the network device (200), where the UE (100) is transitioning to the RRC inactive state or is in the RRC inactive state. The MAC reset controller (141) terminates all running timers except MBS multicast DRX timers in response to determining that the UE (100) is configured to receive the MBS multicast service in RRC inactive state and/or receiving the MBS multicast service in RRC inactive state from the network device (200), and flushing all soft buffers for all DL HARQ processes except the soft buffer for the DL HARQ process is for the MBS multicast service in the RRC inactive state, or terminates all running timers in response to determining that the UE (100) is not configured to receive the MBS multicast service in the RRC inactive state and/or not receiving the MBS multicast service in the RRC inactive state from the network device (200), and flushing all soft buffers for all DL HARQ processes. The MAC reset controller (141) enhances the MAC reset mechanism based on the terminating all running timers except MBS multicast DRX timers and flushing all soft buffers for one or moreDL HARQ processes except the soft buffer for DL HARQ process for the MBS multicast service in the RRC inactive state, or terminating all running timers and flushing all soft buffers for one or moreDL HARQ processes.

The MBS multicast DRX timers includes, one or more, the DRX on-duration timer for the PTM, the DRX inactivity timer for the PTM, a DRX HARQ RTT timer for the PTM, the DRX retransmission timer for the PTM.

Furthermore, the MAC reset controller (141) considers the next received transmission for the TB as the first transmission for one or more DL HARQ processes, except for the DL HARQ process being used for the MBS multicast service to enhance the MAC reset mechanism, or considers the next received transmission for the TB as the first transmission for all DL HARQ processes to enhance the MAC reset mechanism.

The HARQ feedback controller (142) receives the service from the network device (200), where the service includes the MBS multicast service and the MBS broadcast service. The HARQ feedback controller (142) establishes a session with the network device (200) for the received service. The HARQ feedback controller (142) receives a Radio Resource Control (RRC) reconfiguration message along with the HARQ parameter for MBS from the network device (200).

The HARQ parameter for the MBS includes, one or more, HARQ feedback mode information and HARQ feedback enabler information. The HARQ feedback mode information includes, one or more, a combination of Acknowledgement (ACK) and Negative Acknowledgement (NACK), a NACK only, and an absence of the HARQ feedback mode field. The HARQ feedback enabler information includes, one or more, an enable option for the HARQ feedback message, a Downlink Control Indication (DCI) based enabler option for the HARQ feedback message wherein received DCI to indicate an enable value or disable value, and an absence of the HARQ feedback enabler field. The HARQ feedback controller (142) configures the UE (100) based on the received HARQ parameter for the MBS. The HARQ feedback controller (142) receives an MBS packet(s) from the network device (200). The HARQ feedback controller (142) sends a HARQ feedback message for the received MBS packet to the network device (200) based on the configuration.

Furthermore, the HARQ feedback controller (142) determines whether the HARQ feedback mode information includes, one or more, the combination of the ACK and the NACK and the NACK only, and the HARQ feedback enabler information includes, one or more, the enable option for the HARQ feedback message and the DCI based enabler option for the HARQ feedback message where received DCI indicates the enable value. Furthermore, the HARQ feedback controller (142) sends the HARQ feedback message for the received MBS packet to the network device (200) in response to determining that the HARQ feedback mode information includes, one or more, the combination of the ACK and the NACK and the NACK only, and the HARQ feedback enabler information includes, one or more, the enable option for the HARQ feedback message and the DCI based enabler option for the HARQ feedback message where received DCI indicates the enable value. Furthermore, the HARQ feedback controller (142) skips sending of the HARQ feedback message for the received MBS packet to the network device (200) in response to determining that the HARQ feedback enabler information includes, one or more, the absence of the HARQ feedback enabler field and the DCI based enabler option for HARQ feedback message where the received DCI indicates the disable value.

The group notification handler (143) receives a group notification message from a network device (200), wherein the group notification message includes the first Identity (ID). The group notification message includes, one or more, a paging message, a group paging message, a MBS Control Channel (MCCH) change notification message, a System Information Block (SIB) message and an MCCH message. The group notification handler (143) detects the second ID for the UE (100), where the second ID is allocated by the upper layer or the second ID is determined based on the MBS multicast service in which the UE (100) is interested. The group notification handler (143) determines whether the first ID matches with the second ID. The group notification handler (143) sends the first ID and other information to the at least one upper layer, where the other information comprises an identity of the UE (100), an access type (e.g. non-3GPP access) or any future addition of status or information in a paging message.

The group notification handler (143) determines whether the UE (100) is in the RRC idle state or the RRC inactive state. The group notification handler (143) initiates an RRC connection establishment procedure, upon a request from the upper layer, in response to determining that the UE (100) is in the RRC idle state and initiating transmission of an RRC setup request message to the network device (200). The group notification handler (143) initiates an RRC connection resumption procedure in response to determining that the UE (100) is in the RRC inactive state and initiating transmission of an RRC resume request message to the network device (200). Transmission of RRC setup request or RRC resume request may be in accordance to the access category or access identity. The access category and/or access identity are, for example, can be configured by an operator to control access attempt by the UE (100) to the network device (200). E.g. the access identity means the UE (100) is configured for mission critical service. The access category implies a combination of conditions related to the UE (100) and the type of access attempt e.g. access category-1 means the UE (100) is configured for delay tolerant service and subject to access control. Access attempt for all except emergency is controlled.

The RRC signalling controller (144) sends an RRC reestablishment request message and/or an RRC resume request message to the network device (200). The RRC signalling controller (144) receives the RRC setup message in response to sending the RRC reestablishment request message and/or the RRC resume request message. The RRC signalling controller (144) determines whether the UE (100) is configured with the MBS broadcast service and/or receiving the MBS broadcast service from the network device (200).

The RRC signalling controller (144) releases radio resources for established Radio Bearers (RBs) except a Signalling Radio Bearer-0 (SRB-0) including release of, one or more, a Radio link control (RLC) entity, a Packet Data Convergence Protocol (PDCP) entity, and a Service Data Adaption Protocol (SDAP) entity, except for the MRBs of the MBS broadcast service, and releases an RRC configuration except for default Layer 1 (L1) parameter values, default Medium Access Control (MAC) cell group configuration and Common Control Channel (CCCH) configuration, and except for the RRC configuration for MBS Radio Bearers (MRBs) of the MBS broadcast service in response to determining the UE (100) is configured with the MBS broadcast service and receiving the MBS broadcast service from the network device (200).

The RRC signalling controller (144) releases radio resources for established RB) except the SRB-0 including release of one or more, the RLC entity, the PDCP entity, and the SDAP entity, and releases the RRC configuration except for the default L1 parameter values, the default MAC cell group configuration and the CCCH configuration.

Although the FIG. 3 shows various hardware components of the UE (100) but it is to be understood that other embodiments are not limited thereon. In other embodiments, the UE (100) may include less or more number of components. Further, the labels or names of the components are used only for illustrative purpose and does not limit the scope of the invention. One or more components can be combined together to perform same or substantially similar function to enhance the MAC reset and the other RRC procedures in the NR MBS communication.

FIG. 4 is a flow diagram (400) illustrating a method for enhancing the MAC reset in the NR MBS communication, according to an embodiment as disclosed herein. Steps (401-406) performs by the UE (100) for enhancing the MAC reset in the NR MBS communication.

At 401, the method includes determining one or more scenario/events by the upper layers (e.g., RRC) and invoking the MAC entity to perform the MAC reset, where one or more scenario/events include, but are not limited to, the reception of RRC release message with suspend configuration, the RRC connection reestablishment message, the RRC reject message, switching to the RRC idle state, the abortion of RRC connection establishment, detecting the radio link failure, and expiring of the timerT300.

At 402, the method includes determining whether the UE (100) is configured with the MBS broadcast service and received the one or more MBS broadcast services.

At 403, the method includes terminating, by the MAC entity, the all timers (if running), except the MBS broadcast DRX timers in response to determining that the UE (100) is configured with the MBS broadcast service and received the one or more MBS broadcast service. The MBS broadcast DRX timers include the DRX on duration timer for the PTM, the DRX inactivity timer for the PTM, the DRX HARQ RoundTrip-Time (RTT) timer for the DL-PTM, and the DRX retransmission timer for the DL-PTM.

At 404, the method includes flushing, by the MAC entity, the soft buffers for all DL HARQ processes, except the soft buffer for DL HARQ process being used for the broadcast service. Same or different HARQ processes are used for receiving MCCH and MBS broadcast MTCH data for the broadcast service.

At 405, the method includes terminating, by the MAC entity, all timers (if running) in response to determining that the UE (100) is not configured with the MBS broadcast service and has not received the one or more MBS broadcast services.

At 406, the method includes flushing, by the MAC entity, the soft buffers for all DL HARQ processes.

[A] MAC reset operation: Before an introduction of the NR MBS communication to the 5G, it was only unicast services (i.e. unicast radio bearers) which were served by a protocol stack. Consequently, the MAC reset operation in a legacy may now affect an operation and functioning of the multicast/broadcast services (i.e. MBS radio bearers). Hence, there is a need to enhance the MAC reset operation when the UE (100) may be supporting/receiving the MBS services.

In an embodiment, the MAC reset operation is performed irrespective of whether the UE (100) supports and/or receivesthe unicast services and/or the MBS services.

In an embodiment, the MAC reset operation is performed when the UE (100) supports and/or receives the unicast services and/or MBS services with PTP bearers.

In an embodiment, the MAC reset operation is not performed when the UE (100) supports and/or receives the unicast services and the MBS services together. For example, when the MAC reset is caused due to the unicast service support is not performed if and when the MBS service is in operation.

In an embodiment, the MAC reset operation is not performed when the UE (100) supports and/or receives the unicast services and the MBS services with PTM bearers together.

In an embodiment, the MAC reset operation is performed as at least one of the following approaches as mentioned below.

a. Legacy MAC reset operation is modified for the MBS.
b. MAC reset is decomposed into anMBS MAC reset and a non-MBS MAC reset.

In this document, we use the terms "reset MAC" to imply legacy MAC reset, while "non-MBS MAC reset" and "MBS MAC reset" imply respectively selective resetting of non-MBS and MBS part of MAC reset. The MBS MAC reset and the Non-MBS MAC reset—the legacy MAC reset is decomposed into the MBS MAC reset and the non-MBS MAC reset.

In an embodiment, the "MBS MAC reset" and "non-MBS MAC reset" parts can be invoked based on a scenario(s) or situation(s) for the MAC reset operation. Furthermore, invocation of these parts can be separate and at different times and/or collectively and at the same time.

In an embodiment, when the legacy MAC reset is to be performed, both the parts of "MBS MAC reset" and "non-MBS MAC reset" can be invoked.

Non-MBS MAC reset: If the "non-MBS MAC reset" of the MAC entity is requested by the upper layers, the MAC entity performs at least one of the following steps: The MAC entity initializes Bj for each logical channel to zero, except for logical channel(s) for the MBS. The MAC entity initializesSBj for each logical channel to zero if a sidelink resource allocation mode 1 is configured by the RRC. The MAC entity stops all timers (if running), except timers for the MBS. The MAC entity considers all timeAlignmentTimers as expired and performs corresponding actions in clause 5.2 as specified in 3GPP TS38.321. The MAC entity sets NDIs for all uplink HARQ processes to a value of 0. The MAC entity sets the NDIs for all HARQ process IDs to a value of 0 for monitoring a PDCCH in the sidelink resource allocation mode 1. The MAC entity stops, if any, ongoing random access procedure. The MAC entity discards explicitly signalled contention-free random access resources for 4-step RA type and 2-step RA type, if any. The MAC entity flushes an Msg3 buffer (Msg3 buffer stores Msg3 i.e. RRC connection establishment request). The MAC entity flushes an MSGA buffer (MSGA refers to message sent in first step of RA in 2-step RA). The MAC entity cancels, if any, triggered scheduling request procedure. The MAC entity cancels, if any, triggered buffer status reporting procedure, except for the MBS (e.g. RLC/PDCP status PDU). The MAC entity cancels, if any, triggered power headroom reporting procedure. The MAC entity cancels, if any, triggered consistent LBT failure. The MAC entity cancels, if any, triggered BFR. The MAC entity cancels, if any, triggered sidelink buffer status reporting procedure. The MAC entity cancels, if any, triggered Pre-emptive buffer status reporting procedure. The MAC entity cancels, if any, triggered recommended bit rate query procedure. The MAC entity cancels, if any, triggered configured uplink grant confirmation. The MAC entity cancels, if any, triggered configured sidelink grant confirmation. The MAC entity cancels, if any, triggered desired guard symbol query. The MAC entity flushes the soft buffers for all DL HARQ processes, except for those pertaining to the MBS. The MAC entity considers the next received transmission for a TB as a first transmission for each DL HARQ process, except for those pertaining to the MBS. The MAC entity releases, if any, temporary Cell RNTI (C-RNTI). The MAC entity resets all BFI_COUNTERs and LBT-_COUNTERs (These counters track Beam failure and Listen Before Talk events).

MBS MAC reset: If the "MBS MAC reset" of the MAC entity is requested by upper layers, the MAC entity performs at least one of the following steps: the MAC entity initializes the Bj for each PTP logical channel to zero. The MAC entity stops all timers (if running), for the MBS. The MAC entity considers all timeAlignmentTimers as expired and performs corresponding actions in clause 5.2 as specified in 3GPP TS 38.321. The MAC entity sets the NDIs for all HARQ process IDs to the value 0 for monitoring the PDCCH for the MBS. The MAC entity stops, if any, the ongoing random access procedure for the MBS purposes. The MAC entity discards the explicitly signalled contention-free random access resources for the 4-step RA type and the 2-step RA type, if any, for the MBS purpose. The MAC entity flushes the Msg3 buffer, if any, for the MBS. The MAC entity flushes the MSGA buffer, if any, for the MBS. The MAC entity cancels, if any, the triggered scheduling request procedure for the PTP. The MAC entity cancels, if any, the triggered buffer status reporting procedure for the PTP. The MAC entity cancels, if any, the triggered pre-emptive buffer status reporting procedure. The MAC entity cancels, if any, the triggered recommended bit rate query procedure. The MAC entity cancels, if any, the triggered configured MBS grant confirmation. The MAC entity flushes the soft buffers for all DL HARQ processes for the MBS. The MAC entity considers the next received transmission for a TB as the first transmission for each DL HARQ process for the MBS. The MAC entity releases, if any, the G-RNTI(s).

In an embodiment, MAC reset operation is not applied to HARQ process or processes that are used or associated with MBS broadcast (e.g. soft buffers for HARQ process or processes for MCCH and MTCHs are not flushed) and MAC reset operation is not applied to timers that are associated to the MBS broadcast services (e.g. DRX timers for MBS broadcast services are not stopped).

In an embodiment, one or more of the steps of the above described MBS MAC reset are applied to MBS multicast. For example, for MBS multicast MAC reset, the following steps can be pursued:

a) Stop (if running) all timers associated to MBS Multicast;
b) Flush the soft buffers for all DL HARQ processes associated to MBS Multicast;
c) For each DL HARQ process associated to MBS Multicast, consider the next received transmission for a TB as the very first transmission.

Some of the specific cases are illustrated here, wherethe MAC reset operation may be modified considering the MBS service configuration and/or reception by the UE (100).

Case-1: a cell reselection during on-demand a SI request for anRRCSystemInfoRequest or anRRCSystemInfoRequest message with a rrcPosSystemInfoRequest: In an embodiment, when the UE (100) is waiting for acknowledgement for the SI request for the RRCSystemInfoRequest and/or the RRCSystemInfoRequest message with the rrcPosSystemInfoRequestand the cell reselection occurs, the MAC reset is performed considering whether the MBS is configured and/or the MBS service is being received by the UE (100). If so, the UE (100) performs the non-MBS MAC reset; otherwise, the legacy MAC reset is performed. Furthermore, the UE (100) can also consider whether the reselected cell supports the MBS service and/or is part of the same MBS service area and/or is part of synchronized transmission for the MBS service and/or is part of the same single frequency network. If so, the MBS service can be continued and a nonMBS-specific reset of MAC is needed. Relevant information(s) for a neighbour cell or target cell can be provided by the network device (200) in the broadcast message and/or the UE (100) has previously been acquired from the network device (200).

Case 2: a cell reselection during on-demand SI request for the RRCSystemInfoRequest message with a rrcMBSSystemInfoRequest: In an embodiment, when the UE (100) is waiting for an acknowledgement for the SI request for the RRCSystemInfoRequest message with the rrcMBSSystemInfoRequest and the cell reselection occurs, the MAC reset is performed considering whether the MBS is configured and/or the MBS service is being received by the UE (100). If so, the UE (100) performs the non-MBS MAC reset and the MBS MAC reset. Furthermore, the UE (100) can also consider whether the reselected cell supports the MBS service and/or is part of the same MBS service area and/or is part of synchronized transmission for the MBS service and/or is part of the same single frequency network. If so, the MBS service can be continued and the non-MBS-specific reset of MAC is needed. Relevant information(s) for the neighbour cell or target cell can be provided by the network device (200) in the broadcast message and/or the UE (100) has previously been acquired from the network device (200).

Case 3: T300 expiry: In an embodiment, when the timer T300 expires, if the UE (100) is configured with the MBS and/or receiving MBS service, the UE (100) releases the MAC configuration and re-establishes RLC for all RBs that are established except for the MBS MRB and performs the non-MBS MAC reset.

If the UE (100) is not configured with the MBS and/or receiving MBS service, the UE (100) resets the MAC (as in legacy), releases the MAC configuration and re-establish RLC for all RBs that are established.

Case 4: an abortion of an RRC connection establishment procedure: In an embodiment, upon abortion of the RRC connection establishment procedure, if the UE (100) is configured with the MBS and/or receiving the MBS service, the UE (100) releases the MAC configuration and re-establishes the RLC for all RBs that are established except for the MBS MRB and performs the non-MBS MAC reset.

If the upper layers abort the RRC connection establishment procedure, due to a NonAccess Stratum (NAS) procedure being aborted, while the UE (100) has not yet entered RRC_CONNECTED, the UE (100) stops the timer T300 (if running). The UE (100) determines whether the UE (100) receives the MBS service. The UE (100) releases the MAC configuration and re-establish RLC for all RBs that are established except for the MBS MRB in response to determining that the UE (100) receives the MBS service and performs the non-MBS MAC reset.

The UE (100) resets the MAC in response to determining that the UE (100) does not receive the MBS service, the UE (100) releases the MAC configuration and re-establishes the RLC for all RBs that are established.

Case 5: a T304 expiry (reconfiguration with sync failure): In an embodiment, when the timer T304 of the MCG expires and/or the T304 expires when RRC-Reconfiguration is received via other RAT (HO to NR failure), the MAC reset is performed considering whether the MBS is configured and/or the MBS service is being received by the UE (100). If so, the UE (100) performs the non-MBS MAC reset and keeps the configuration of the MBS and/or continues reception of the MBS service.

Case 5: RRC connection reestablishment: In an embodiment, when the RRC connection reestablishment is initiated, and a DAPS bearer is configured for unicast and/or the UE (100) performs both the MBS specific MAC reset and the non-MBS specific MAC reset. Source cell MAC configuration is released. Furthermore, for each DAPS bearer (including MBS bearer if configured for DAPS), the UE (100) releases the RLC entity or entities and the associated logical channel for the source SpCell. The UE (100) reconfigures the PDCP entity to release DAPS.

Case 6: RRC connection release reception or RRC connection release requested by the upper layers or data-inactivity timer expiry and/or going to RRC_IDLE: When the UE (100) receives the RRC connection release or the RRC connection release with redirection from the network device (200) and/or the RRC connection release is requested by the upper layer and/or expiry of a data-inactivity timer and/or expiry of an MBS-data-inactivity timer and/or the UE (100) is going to anRRC_IDLE state, and if the UE (100) is configured with the MBS and/or receiving the MBS service (e.g. a broadcast service), the UE (100) performs the non-MBS MAC reset. That is, the UE (100) preserves the configuration for the MBS service while going to the RRC_IDLE state.

Furthermore, in an embodiment, the UE (100) may release the configuration for certain MBS services (e.g. multicast service mapped to PTP or PTM bearer). In an embodiment, the UE (100) may maintain the configuration for certain MBS services (e.g. multicast service mapped to PTM bearer) when going to the RRC_IDLE.

Furthermore, the UE (100) may not perform cell reselection in cases when MBS service is available on the serving cell.

In an embodiment, when going to RRC_IDLE state, the UE (100) may discard any segments of segmented RRC messages stored except for MCCH.

In an embodiment, when going to RRC_IDLE state, the UE (100) releases all radio resources, including release of the RLC entity, the BAP entity, the MAC configuration and the associated PDCP entity and SDAP for all established RBs and BH RLC channels except for MRBs pertaining to MBS services (e.g. broadcast service).

Case 7: RRC connection release with suspend configuration: When the UE (100) receives the RRC connection release with the suspend configuration from the network device (200), and if the UE (100) is configured with the MBS and/or receiving the MBS service (e.g. a broadcast service), the UE (100) performs the non-MBS MAC reset. That is, the UE (100) preserves the configuration for the MBS service while going to anRRC_INACTIVE state.

Furthermore, in an embodiment, the UE (100) may release the configuration for certain MBS services (e.g. multicast service mapped to PTP or PTM bearer). In an embodiment, the UE (100) may maintain the configuration for certain MBS services (e.g. multicast service mapped to PTM bearer) when going to the RRC_INACTIVE.

When the RRCRelease includes suspendConfig, the UE (100) applies the received suspendConfig. The UE (100) performs the non-MBS MAC reset and release the default MAC Cell Group configuration, if any, when the UE (100) is configured with MBS and/or receiving MBS service (e.g. broadcast service); or the UE (100) resets the MAC and release the default MAC Cell Group configuration, if any; the UE (100) re-establishes RLC entities for SRB1; the UE (100) suspends all SRB(s) and DRB(s), except SRB0 (except for MRBs for MBS services e.g. broadcast service); and the UE (100) indicates PDCP suspend to lower layers of all DRBs (except for MRBs for MBS services e.g. broadcast services).

Case 8: Detection of Radio Link Failure—In an embodiment, the UE (100) may continue the MBS service reception (e.g. broadcast service) after detection of the radio link failure and therefore, undertakes the non-MBS MAC reset.

When any DAPS bearer is configured and T304 is running, the UE (100) consider radio link failure to be detected for the source MCG i.e. source RLF and suspends the transmission and reception of all DRBs in the source MCG, upon T310 expiry in source SpCell or upon random access problem indication from source MCG MAC or upon indication from source MCG RLC that the maximum number of retransmissions has been reached or upon consistent uplink LBT failure indication from source MCG MAC.

When the UE (100) is configured with MBS and/or receiving MBS service (e.g. broadcast service), the UE (100) performs the non-MBS MAC reset. When the UE (100) is not configured with MBS and/or receiving MBS service (e.g. broadcast service), the UE (100) resets the MAC for the source MCG. Then, the UE (100) releases a source connection.

Case 9: RRC connection reject: In an embodiment, the UE (100) may continue the MBS service reception (e.g. broadcast service) upon receiving the RRC connection rejection and therefore, undertakes the non-MBS MAC reset and/or release the default MAC Cell Group configuration.

In an embodiment, in the RRC_INACTIVE state, the UE (100) continues to monitor group paging for the MBS service activation notification. The monitoring for group paging (also termed as group notification) for MBS can be continued irrespective of T302 running status, i.e. whether T302 is running or not running, UE monitors for group paging for MBS.

In an embodiment, UE continues to monitor for group paging for MBS when timer T302 is running.

Case 10: mobility from the NR: In an embodiment, upon mobility from the NR, the UE (100) performs the MBS specific MAC reset and the non-MBS MAC reset.

Case 11: MCG failure information—In an embodiment, upon initiation of the Master Cell Group (MCG) failure reporting and if the UE (100) is configured with the MBS and/or receiving the MBS service, the UE (100) performs the non-MBS MAC reset for the MCG MAC. The MRBs are not suspended.

[B] switching to the PTM mode when the MAC is reset: In an embodiment, the UE (100) switches to the PTM mode for the MBS reception from the PTP or the PTM+PTP or the unicast mode when there is the MAC reset operation is executed for the unicast and/or the MBS PTP (i.e. the MAC entity is reset except for PTM configurations e.g. logical channels, HARQ buffers/processes used for PTM are not affected with the MAC reset operation).

In an embodiment, the MAC reset is executed for the unicast only (i.e. the MAC entity is reset except for both the MBS PTP and the PTM configurations e.g. logical channels, HARQ buffers/processes used for the PTP and the PTM are not affected with the MAC reset operation).

In an embodiment, the MAC reset operation is not executed when the UE (100) is receiving the MBS service (e.g. multicast and/or broadcast).

In an embodiment, the MAC reset operation is not executed when the UE (100) is receiving the MBS service (e.g. multicast and/or broadcast) and the UE (100) transits across the RRC_CONNECTED and/or the RRC_IDLE and/or the RRC_INACTIVE states and the UE (100) continues receiving the MBS service (e.g. multicast and/or broadcast).

In an embodiment, the MAC reset operation is executed when the UE (100) is receiving MBS multicast service and the UE (100) transits across the RRC_CONNECTED and the RRC_IDLE and/or the RRC_INACTIVE states.

In an embodiment, the MBS MAC reset operation is executed in the RRC_IDLE and/or the RRC_INACTIVE and/or the RRC_CONNECTED states, when the UE (100) undertakes one or more the following operations for the MBS such as deactivation of the MBS service, activation of the MBS service, deactivation of a PTM path and/or deactivation of the G-RNTI, release of the MBS service (e.g. when notified from the network device (200) or informed from dedicated/broadcast signalling, loss of interest in the MBS service by the UE (100), expiry of inactivity timer and so on), change of the RRC state (e.g. between the RRC_IDLE and/or the RRC_INACTIVE and/or the RRC_CONNECTED states), cell selection to new cell/area, handover to the new cell/area, expiry of a data-Inactivity Timer and/or an MBS-dataInactivity Timer, and change of security context/keys.

In an embodiment, the UE (100) switches the HARQ buffer and/or retransmission to the PTM from the PTP and/or the unicast mode, when the MAC reset operation is performed for the PTP and/or the unicast mode.

[C] RRC state transition for the MBS session: In an embodiment, when the UE (100) is interested in the MBS session and/or receiving the MBS session, the UE (100) transits to the RRC state and/or persists on the RRC state according to one of the conditions or a possible combination of conditions as follows, as shown in Table 1.

TABLE 1

Trigger conditions for RRC state transitions

| Initial State | Final State RRC IDLE | RRC INACTIVE | RRC CONNECTED |
|---|---|---|---|
| RRC IDLE | Upon reception of deactivation of multicast session<br>Upon Data-In-activity timer and/or MBS-dataInactivity Timer expiry<br>Reception of network indicated back-off (due to session is not yet activated)<br>when UE loses interest in multicast session<br>Activation/reactivation of MBS service is not received for a defined time period | — | Upon reception of service request or a group join request or a group release request from higher layer<br>Upon reception of group notification (activation) of multicast session<br>Network indicated a back-off (due to session is not yet activated), however back off duration is short |
| RRC INACTIVE | Receiving RRC release<br>Upon reception of deactivation of multicast session<br>Reception of release of multicast session<br>Upon Data-In-activity timer and/or MBS-dataInactivity Timer expiry<br>State if there are no low latency requirements for the multicast session and/or no quick reactivation may be needed<br>Reception of network indicated back-off (due to session is not yet activated)<br>When UE loses interest in multicast session | Receiving RRC release with suspend config<br>Reception of deactivation of multicast session<br>Reception of release of multicast session<br>Upon Data-In-activity timer and/or MBS-dataInactivity Timer expiry<br>If there are low latency requirements for the multicast session and/or quick reactivation may be needed<br>Reception of network indicated back-off (due to session is not yet activated)<br>When UE loses interest in multicast session | Upon reception of service request or a group join request or a group release request from higher layer<br>Upon reception of group notification (activation) of multicast session<br>Network indicated a back-off (due to session is not yet activated), however back off duration is short |
| RRC CONNECTED | Receiving RRC release<br>Upon reception of deactivation of multicast session<br>Reception of release of multicast session<br>Upon Data-In-activity timer and/or MBS-dataInactivity Timer expiry<br>State if there are no low latency requirements for the multicast session | Receiving RRC release with suspend config<br>Reception of deactivation of multicast session<br>Reception of release of multicast session<br>Upon Data-In-activity timer and/or MBS-dataInactivity Timer expiry<br>If there are low latency requirements for the multicast | Upon reception of group notification (activation) of multicast session<br>Network indicated a back-off (due to session is not yet activated), however back off duration is short |

TABLE 1-continued

| Trigger conditions for RRC state transitions | | | |
|---|---|---|---|
| Initial | Final State | | |
| State | RRC IDLE | RRC INACTIVE | RRC CONNECTED |
| | and/or no quick reactivation may be needed<br>Reception of network indicated back-off (due to session is not yet activated)<br>When UE loses interest in multicast session | session and/or quick reactivation may be needed<br>Reception of network indicated back-off (due to session is not yet activated) | |

[D] Unified Access Control UAC for the MBS/multicast service: In an embodiment, the access category and/or the access identities are assigned to one or more MBS service i.e. Temporary Mobile Group Identity (TMGI) (e.g. broadcast service, multicast session) and/or one or more group of MBS services.

In an embodiment, the access category and/or the access identities are assigned to one or more TMGI through one or more approaches or a combination of approaches such as User Service Description (USD) or Electronic Program Guide (EPG), NAS signalling e.g. when the UE (100) joins the multicast group, dedicated signalling message like RRC reconfiguration message, deactivation signalling message, RRC release message, RRC release with suspend configuration message, MCCH, SIB1 or other SIB or MBS specific SIB, group notification message (e.g. unicast paging, group paging or MCCH), and PDCCH/DCI.

In an embodiment, access barring information for the MBS/multicast session(s) and/or congestion status information for the cell/area is provided through one or more approaches such as the SIB1 or other SIB or MBS specific SIB, the MCCH, the group notification message (e.g. unicast paging, group paging or MCCH), the PDCCH/DCI, the USD or EPG, the NAS signalling e.g. when UE joins the multicast group, specified in pre-defined tables for different types of the MBS services, the dedicated signalling message like RRC reconfiguration message, the deactivation signalling message, the RRC release message, and the RRC release with suspend configuration message.

In an embodiment, one or more priorities are assigned to one or more MBS services and/or one or more group of MBS services. More than one MBS services and/or group of MBS services may also have equal priority.

In an embodiment, access barring information for the MBS/multicast session(s) is received by the UE (100) by one or more afore-mentioned approaches, the UE (100) forwards the access barring information to the upper layer.

RAN admission control based congestion control: In case of the multicast session, the UE (100) has to move to the RRC_CONNECTED state to receive the service. In case of congestion at the network device (200) due to the multicast services, the RAN can reject the UE (100) based on the access request. To enable this, a. Two new establishment causes are introduced and is indicated in an RRCSetupRequest message when the UE (100) is trying to setup a connection for receiving the MBS service.

RRCSetupRequest message is as follows, as shown in Table 2.

TABLE 2

```
RRCSetupRequest ::=          SEQUENCE {
  rrcSetupRequest                  RRCSetupRequest-IEs
}
RRCSetupRequest-IEs ::=        SEQUENCE {
  ue-Identity                      InitialUE-Identity,
  establishmentCause                 EstablishmentCause,
  spare                        BITSTRING (SIZE (1))
}
InitialUE-Identity ::=          CHOICE {
  ng-5G-S-TMSI-Part1                 BITSTRING (SIZE (39)),
  randomValue                      BITSTRING (SIZE (39))
}
EstablishmentCause ::=          ENUMERATED {
                             emergency, highPriorityAccess, mt-
Access, mo-Signalling,
                             mo-Data, mo-VoiceCall, mo-VideoCall,
mo-SMS, mps-PriorityAccess, mcs-PriorityAccess,
mbs-delayTolerantServiceAccess, mbs-delayCriticalServiceAccess, spare4,
spare3, spare2, spare1}
```

b. Two new resume causes are introduced and is indicated in the RRCResume Request message when the UE (100) is moving from the RRC_INACTIVE state to the RRC_CONNECTED to receive the MBS service.

ResumeCause information element is as follows, as shown in Table 3.

TABLE 3

```
ResumeCause ::=    ENUMERATED { emergency, highPriorityAccess,
mt-Access, mo-Signalling,
                   mo-Data, mo-VoiceCall, mo-VideoCall,
mo-SMS, rna-Update, mps-PriorityAccess,
                   mcs-PriorityAccess, mbs-
delayTolerantServiceAccess, mbs-delayCriticalServiceAccess, spare3,
spare4, spare5 }
```

UAC based congestion control: One advantage in employing a UAC based framework is the access control can be applied to the broadcast and/or the multicast as whole or to specific session/group of session. This can be achieved using existing UAC framework by introducing the following changes, a. A new standardised set of access identities can be introduced for the MBS services and this can be specifically barred in the SIB1.
b. Operator classified access category can be assigned per MBS service ID can the association can be done by either:
i. Semi statically: as part of configuration done as part of service announcement/the USD.

ii. Dynamically: in MBS signalling which can be as part of the SIB1 or the MBS SIB or the MCCH.

In an embodiment, two new access Identities are introduced X, Y (can have values in the reserved range of 3-11) to associate with the MBS services which have higher tolerances to delays and services which require low latency respectively. Introducing below entries to table 4.5.2.1 in 3GPP TS 24.501, as shown in Table 4.

TABLE 4

| Access identity | UE configuration |
|---|---|
| X | Delay tolerant MBS services |
| Y | Delay Critical MBS services |

The access category associated with each of the MBS services are conveyed to the UE (100) via one or combination of the USD, service announcements, the NAS signalling, the MCCH, and the SIB.

In an embodiment, adding below entry into mapping table for the access identity/the access category and RRC Establishment cause, as shown in Table 5.

TABLE 5

| Access identity | Access category | RRC establishment cause |
|---|---|---|
| X | Any category | mbs-delayTolerantServiceAccess |
| Y | Any category | mbs-delayCriticalServiceAccess |

FIGS. 5A-5D are sequence diagrams illustrating theHARQfeedback mechanism in the MBS communication, according to an embodiment as disclosed herein.

Referring to FIG. 5A: at 501, the network device (200) initiates an MBS multicast session with the UE (100).

At 502, the network device (200) sends the RRC reconfiguration message to the UE (100) for an MRB setup. The RRC reconfiguration message includes the HARQ feedback enabler information (e.g., enable, DCI based, field absent) and the HARQ feedback mode information (e.g., ACK-NACK, NACK only, field absent).

At 503, the network device (200) sends an MBS MAC PDU to the UE (100).

At 504, the UE (100) sends the HARQ feedback message as the HARQ feedback enabler information (e.g., set to enable) in response to receiving the MBS MAC PDU from the network device (200).

At 505, the network device (200) continues the MBS multicast session ongoing with the UE (100).

At 506, the network device (200) sends the RRC reconfiguration message to the UE (100) for an MRB modify. The RRC reconfiguration message includes the HARQ feedback enabler information (e.g., enable, DCI based, field absent) and the HARQ feedback mode information (e.g., ACK-NACK, NACK only, field absent).

At 507, the network device (200) sends an MBS MAC PDU to the UE (100).

At 508, the UE (100) sends the HARQ feedback message as the HARQ feedback enabler information (e.g., set to enable) in response to receiving the MBS MAC PDU from the network device (200).

Referring to FIG. 5B: at 509, the network device (200) initiates the MBS multicast session with the UE (100).

At 510, the network device (200) sends the RRC reconfiguration message to the UE (100) for the MRB setup. The RRC reconfiguration message includes the HARQ feedback enabler information (e.g., set to enable) and the HARQ feedback mode information (e.g., set to NACK only).

At 511, the network device (200) sends the MBS MAC PDU to the UE (100).

At 512, the UE (100) sends the HARQ feedback message as the HARQ feedback enabler information (e.g., set to enable) and the HARQ feedback mode information (e.g., set to NACK only) in response to not receiving the MBS MAC PDU from the network device (200).

At 513, the network device (200) continues the MBS multicast session ongoing with the UE (100).

At 514, the network device (200) sends the RRC reconfiguration message to the UE (100) for the MRB modify. The RRC reconfiguration message includes the HARQ feedback enabler information (e.g., field absent) and the HARQ feedback mode information (e.g., field absent).

At 515, the network device (200) sends the MBS MAC PDU to the UE (100) and the UE (100) does not send the HARQ feedback message as the HARQ feedback enabler information (e.g., field absent) and the HARQ feedback mode information (e.g., field absent) in response to receiving the MBS MAC PDU from the network device (200).

Referring to FIG. 5C: at 516, the network device (200) initiates the MBS multicast session with the UE (100).

At 517, the network device (200) sends the RRC reconfiguration message to the UE (100) for the MRB setup. The RRC reconfiguration message includes the HARQ feedback enabler information (e.g., field absent) and the HARQ feedback mode information (e.g., field absent).

At 518, the network device (200) sends the MBS MAC PDU to the UE (100) and the UE (100) does not send the HARQ feedback message as the HARQ feedback enabler information (e.g., field absent) and the HARQ feedback mode information (e.g., field absent) in response to receiving the MBS MAC PDU from the network device (200).

At 519, the network device (200) continues the MBS multicast session ongoing with the UE (100).

At 520, the network device (200) sends the RRC reconfiguration message to the UE (100) for the MRB modify. The RRC reconfiguration message includes the HARQ feedback enabler information (e.g., set to enable) and the HARQ feedback mode information (e.g., set to NACK only).

At 521, the network device (200) sends the MBS MAC PDU to the UE (100).

At 522, the UE (100) sends the HARQ feedback message as the HARQ feedback enabler information (e.g., set to enable) and the HARQ feedback mode information (e.g., set to NACK only) in response to not receiving the MBS MAC PDU from the network device (200).

Referring to FIG. 5D: at 523, the network device (200) initiates the MBS multicast session with the UE (100).

At 524, the network device (200) sends the RRC reconfiguration message to the UE (100) for the MRB setup. The RRC reconfiguration message includes the HARQ feedback enabler information (e.g., set to DCI based) and the HARQ feedback mode information (e.g., set to ACK-NACK).

At 525, the network device (200) continues the MBS multicast session ongoing with the UE (100).

At 526, the network device (200) sends a DCI enable indication to the UE (100) for the HARQ feedback mechanism.

At 527, the network device (200) sends the MBS MAC PDU to the UE (100).

At 528, the UE (100) sends the HARQ feedback message as the HARQ feedback enabler information (e.g., DCI enable) in response to receiving the MBS MAC PDU from the network device (200).

At 529, the network device (200) sends a DCI disable indication to the UE (100) for HARQ feedback mechanism.

At 530, the network device (200) sends the MBS MAC PDU to the UE (100) and the UE (100) does not sends the HARQ feedback message as the HARQ feedback enabler information (e.g., DCI disable) in response to receiving the MBS MAC PDU from the network device (200).

[E] Dedicated RRC signalling for the MBS service: In an embodiment, when the dedicated RRC signalling (e.g. indicating activation and/or MBS configuration) is received by the UE (100) and the UE (100) is in the RRC_CONNECTED state and the TMGI in the message matches the TMGI (or MBS session Id) in which the UE (100) is interested and has been deactivated, the UE (100) performs one or more following opcrations:

a. The UE (100) forwards the activated TMGI (or MBS session Id) and other information to the upper layer.
b. The UE (100) reactivates the deactivated MBS bearer (the PTM or the PTP or the PTM+PTP) and start receiving the MBS service.
c. Upon receiving request from the upper layer, the UE (100) reactivates the deactivated MBS bearer (the PTM or the PTP or the PTM+PTP) and start receiving the MBS service.

In an embodiment, upon reactivating and/or resuming the deactivated the MBS service/session, if a TA timer is not running, the UE (100) initiates a random access request.

In an embodiment, when the dedicated RRC signalling indicating activation and/or the MBS configuration is received by the UE (100) and the UE (100) is in the RRC_CONNECTED state and the Data-Inactivity Timer and/or the MBSData-Inactivity Timer is not running, start the Data-InactivityTimer and/or the MBSData-Inactivity-Timer; else, restart the Data-InactivityTimer and/or the MBSData-InactivityTimer.

In an embodiment, when the dedicated RRC signalling (e.g. indicating deactivation) is received by the UE (100) and the UE (100) is in the RRC_CONNECTED state and the TMGI in the message matches the TMGI (or MBS session Id) in which the UE (100) is interested and/or has been receiving, the UE (100) performs one or more of the following operations, a. The UE (100) forwards the deactivated TMGI (or MBS session Id) and other information to the upper layer.
b. The UE (100) suspends and/or releases the MBS bearer (the PTM or the PTP or the +PTP) and stops receiving the MBS service.
c. The UE (100) starts a timer to track potential reactivation and/or transit to the RRC_IDLE/RRC_INACTIVE after timer expiry. Once the UE (100) transits to the RRC_IDLE/RRC_INACTIVE state, the UE (100) starts monitoring for the group notification for the deactivated TMGI.

RRC reconfiguration message structure, as shown in Table 6.

TABLE 6

| Configurations | Fields | Usage |
|---|---|---|
| Bearer Type | PTM/PTP/Split | Bearer type can be signalled explicitly or by associating the broadcast/multicast bearer identity signalled as part of RadioBearerConfig with the ID signalled in RlcBearerConfig |
| IsMRB | True/false | Indicates that the bearer is configured as MBS bearer |
| Bearer Id | Bearer Identity | MBS Bearer identity |
| RRC state | CONNECTED, INACTIVE, IDLE | Which states MBS service can be received and/or continued |
| PTM | G-RNTI, TMGI, SessionId, OnDurationTimer, Drx-InactivityTimer, drx-HARQ-RTT-TimerDL, drx-RetransmissionTimerDL, SchedulingPeriod, StartOffset | Either PTM or PTP or split bearer with both PTM & PTP PTP to follow PTM DRX scheduling or unicast DRX |
| PTP | TMGI, SessionId | SPS configuration |
| RRC | MBS-SPS-ConfigToAddModList MBS-SPS-ConfigToReleaseList MBS-SPS-ConfigDeactivationState MBS-SPS-ConfigDeactivationStateList beamFailureRecoveryConfig MBS-pucch-Config MBS-CSI-Resource-Config MBS-CSI-Report config MBS-Measure-Config PDSCH-Config MBS-PDSCH-Time Domain Resource Allocation (TDRA) MBS-PDSCH-Aggregation Factor | Configuration for beam failure recovery MBS-PUCCH config used for HARQ feedback and/or CSI for MBS on PUCCH Configuration for CSI resource for MBS reference signal resources) (including e.g. group common scrambling identity) Configuration for CSI reporting for MBS MBS-Measure-Config for measurements for MBS resources and reporting (including CSIRS/SSB reference signal resources) |

TABLE 6-continued

| Configurations | Fields | Usage |
|---|---|---|
| | | List of time-domain configurations for timing of DL assignment to DL data<br>Number of repetitions for MBS data |
| SDAP-Config | pdu-Session,<br>mappedQoS-FlowsToAdd,<br>mappedQoS-FlowsToRelease | SDAP-Config and PDCP-Config depending on the common PDCP or different PDCP for PTM and PTP bearers, will be common or separate |
| PDCP-Config | pdcp-SN-SizeUL,<br>pdcp-SN-SizeDL,<br>headerCompression,<br>statusReportRequired,<br>outOfOrderDelivery,<br>t-Reordering,<br>cipheringDisabled<br>initialCount Value<br>INTEGER(0 . . . 4294967295) | t-reordering should be configurable based on HARQ modes applicable e.g. t-rordering timer is configured with value 0 or is absent from configuration<br>Initial count value is signalled by network and which is to be applied for PDCP state variables - RX_NEXT and RX_DELIV. Signalled only in case the radio bearer is of MRB type |
| RLC-Config | DL UM RLC<br>t-Ressembly<br>AM RLC<br>SN-fieldLength,<br>t-Reassembly,<br>t-StatusProhibit | DL UM RLC for PTM<br>Either DL UM RLC or AM RLC for PTP |
| MAC | LogicalChannelConfig<br>DataInactivityTimer or<br>MBS-DataInactivityTimer<br>BWP-InactivityTimer or<br>MBS-BWP-InactivityTimer | |
| HARQ | Number of HARQ processes for MBS<br>HARQ modes - HARQ/no HARQ<br>HARQ feedback mode - ACK/NACK based HARQ feedback, NACK only HARQ feedback, feedback less HARQ<br>HARQ feedback enabled or disabled<br>PTM or PTP based retransmission<br>Max HARQ retransmission (PTM)<br>Max HARQ retransmission (PTP) | |
| BWP | BWP information<br>BWP index<br>MBS CFR(s) (single or list)<br>Start PRB<br>Length of PRBs | BWP index can be associated unicast BWP index and utilize same sub-carrier spacing and cyclic prefix |

In an embodiment, the dedicated RRC signalling message is sent from the gNB (i.e. the network device (200)) to the UE (100) to establish and/or modify and/or release radio bearers for reception of the multicast/broadcast traffic.

The MBS configurations are signalled to the UE (100) is the RRC-Reconfiguration message which contains configurations for a list of MBS session the UE (100) has indicated interest in receiving.

Each session configuration indicates a list of MRB IDs which are associated with the MBS session. The configurations of these IDs are signalled in RadiobearerConfig and RlcBearer-Config. Further, a field harqModeindicates the HARQ feedback mode. When indicated, the UE (100) uses NACK only mode or ACK-NACK mode when the field is absent, the UE (100) disables HARQ feedback for PTM leg. This field can be per MBS session or for overall MBS sessions.

An example of the Information Elements related to the Multicast radio bearer configuration is as follows, as shown in Table 7.

TABLE 7

| MBS-SessionConfig field description |
| --- |
| TMGI:<br>An identifier for this MBS session. The UE applies the configuration to receive the multicast data for the session.<br>gRNTI-r17:<br>group RNTI which is monitored for the reception of PTM data<br>mrbList-r17<br>Provides a list of RB IDs which are associated with this session<br>Mbs-DrxConfig<br>Session specific DRX configuration applied for monitoring GRNTI. If absent, UE uses the drx configuration applied for unicast reception<br>harqMode<br>Indicates the HARQ feedback mode. When indicated, the UE uses NACK only mode or ACK-NACK mode When the field is absent, the UE disables HARQ feedback for PTM leg.<br>bwp-ID<br>Indicates the BWP ID for receiving multicast data for this session |

In an embodiment, the UE (100) is configured for MBS measurements including one or more cell selection/reselection, L3 mobility measurements, CSI measurement and CSI reporting with one or more measurement resources such as, a. Specific PDSCH resources in accordance with the PDSCH resources allocated for MBS e.g. MBS BWP or Common Frequency Resource or MBS resources allocated to the UE (100).
b. Specific PDSCH resources in accordance with the PDSCH resources configured for measurement bandwidth.
c. Same PDCCH resources as configured for unicast measurements.

In an embodiment, MBS interest indication is conveyed through UE assistance information message and new triggers are utilized. These triggers include multiple different events e.g. periodic reporting, successful connection establishment, upon entering or leaving the service area, upon session start or stop, upon change of interest, upon change of priority between MBMS reception and unicast reception, upon change to broadcasted system information, upon starting and stopping of Multimedia Broadcast/Multicast Service (MBMS) service(s), upon change of frequency, Bandwidth Part (BWP), bandwidth, numerology or subcarrier spacing of MBMS service, upon handover, meeting certain signal condition threshold, Channel Quality Indicator (CQI) or Channel State Indicator (CSI) threshold, Block Error Rate (BLER) performance threshold, need for delivery mode switching etc. Furthermore, MBS interest indication/UE assistance information message is triggered when-during HO target cell/frequency/BWP is not matching with that of ongoing MBS service and/or when Delivery Mode 2 (DM2) service (e.g. MBS broadcast services) is available upon handover. To control excessive signalling, prohibit timer is configured and used for UE assistance information.

FIG. 6 is a flow diagram (600) illustrating a method for handling the group notification message to initiate the RRC procedure in the MBS communication, according to an embodiment as disclosed herein. Steps (601-606) performs by the UE (100) for handling the group notification message to initiate the RRC procedure in the MBS communication.

At 601, the method includes receiving, by the UE (100), the group notification message from the network device (200) and determines whether the TMGI of the received group notification message matches the TMGI (or MBS session ID) in which the UE (100) is interested, irrespectively of RRC non-connected state (e.g., RRC idle state, RRC inactive state), and forwarding the TMGI (or MBS session ID) and other information to the upper layer(s). At 602, the method includes determining whether the UE (100) is in the RRC idle state.

At 603, the method includes initiating the RRC connection establishment procedure, when the upper layer(s) triggers for MBS multicast service with access category and/or access identity in response to determining that the UE (100) is in the RRC idle state.

At 604, the method includes initiating transmission of the RRC setup request message to the network device (200), where the UE's ID is set by the upper layer(s) (if provided) or by the random value, then sets establishment cause as provided by the upper layer(s).

At 605, the method includes initiating the RRC connection resumption procedure in response to determining that the UE (100) is not in the RRC idle state.

At 606, the method includes initiating transmission of the RRC resume request message/RRC resume request-1 message with resume cause as one of the legacy cause values (e.g., MT-access or high priority access in accordance with access identity range).

[F] Group notification for the MBS service: In an embodiment, when the group notification message (e.g. paging/group paging/MCCH) is received by the UE (100) and the UE (100) is in the RRC_IDLE state and the TMGI in the message matches the TMGI (or MBS session Id) in which the UE (100) is interested, the UE (100) forwards the TMGI (or MBS session Id) and other information to the upper layer.

In an embodiment, when the group notification message (e.g. paging/group paging/MCCH) is received by the UE (100) and the UE (100) is in the RRC_INACTIVE state and the TMGI in the message matches the TMGI (or MBS session Id) in which the UE (100) is interested, the UE (100) initiates the RRC connection establishment procedure.

In an embodiment, when the group notification message (e.g. paging/group paging/MCCH) is received by the UE (100) and the UE (100) is in the RRC_INACTIVE state and the TMGI in the message matches the TMGI (or MBS session Id) in which the UE (100) is interested, the UE (100) initiates RRC connection resumption.

In an embodiment, irrespective of UE RRC state (i.e. RRC_IDLE or RRC_INACTIVE), when the group notification message (e.g. paging/group paging/MCCH) is received by the UE (100) and the TMGI in the message matches the TMGI (or MBS session Id) in which the UE (100) is interested, the UE (100) forwards the TMGI (or MBS session Id) and other information to the upper layer.

In an embodiment, the group notification message can be for activation and/or start and/or stop and/or deactivation and/or release of the MBS service or session e.g. a multicast session.

In an embodiment, a procedure for handling the group notification message (e.g. paging/group paging/MCCH) is described as follows:

a. Upon receiving the paging or the group paging message, the UE (100) performs one or more following actions:

i. If the UE-Identity included in the paging message matches the UE identity allocated by the upper layers:

a. forwards the UE-Identity and access Type (if present) to the upper layers;

ii. If the TMGI included in the paging/group paging message matches the TMGI for the MBS multicast service in which the UE (100) is interested:

a. forwards the TMGI and access Type/other info (if present) to the upper layers;

b. Upon receiving the MCCH change notification and/or MCCH message, the UE (100) performs one or more following actions:

i. If the TMGI included in the MCCH message matches the TMGI for MBS multicast service in which the UE (100) is interested:

a. forwards the TMGI and access Type/other info (if present) to the upper layers;

c. If the upper layer triggers for the MBS multicast service with the category and/or access identity:

i. If the UE (100) is in the idle mode, the UE (100) initiatesthe RRC connection establishment procedure, the UE (100) performs the unified access control procedure using the access category and access identities for the multicast session provided by the upper layers, if the access attempt is barred, the procedure ends, the UE (100) applies the default L1 parameter values as specified in corresponding physical layer specifications except for the parameters for which values are provided in SIB1, the UE (100) applies the default MAC Cell Group configuration, the UE (100) applies the CCCH configuration, the UE (100) applies the timeAlignmentTimerCommon included in the SIB1, the UE (100) startsthe timer T300, the UE (100) initiates transmission of the RRCSetupRequest message (sets UE identity if provided by upper layer or set a random value, setsestablishment cause as newly defined "MBS-Service" or as provided by upper layer (e.g. low-priority-MBS, high-priority-MBS etc.), optionally, include TMGI information).

ii. If the UE (100) is in the inactive mode, the UE (100) initiatesthe RRC connection resumption procedure, the UE (100) performs the unified access control procedure using the access category and access identities for the multicast session provided by the upper layers (if the access attempt is barred, the procedure ends), the UE (100) initiates transmission of the RRCResumeRequest/RRCResumeRequest1 message (with resume cause set to new cause values as "MBS-Service" or as provided by upper layer (e.g. low-priority-MBS, high-priority-MBS etc.) or one of the legacy cause values (e.g. mt-Access or high priority access in accordance with access identity range). Optionally, include TMGI information)

FIG. 7 is a flow diagram (700) illustrating a method for performing the action(s) upon reception of the RRC set up message in the MBS communication, according to an embodiment as disclosed herein. Steps (701 to 706) performs by the UE (100) for performing the action(s) upon reception of the RRC set up message in the MBS communication.

At 701, the method includes receiving, by the UE (100), the RRC setup message in response to sending the RRC reestablishment request message and/or the RRC resume request message and/or the RRC resume request-1 message.

At 702, the method includes determining whether the UE (100) is configured with the MBS broadcast service and received one or more the MBS broadcast service.

At 703, the method includes releasing radio resources for established RBs except the SRB-0 including release of the RLC entity, the PDCP entity, and the SDAP entity, except for the MRBs of the broadcast service in response to determining that the UE (100) is configured with the MBS broadcast service and received one or more the MBS broadcast service.

At 704, the method includes releasing the RRC configuration except for the default L1 parameter values, the default MAC cell group configuration and the CCCH configuration and except for the RRC configuration for the MRBs of the broadcast service.

At 705, the method includes releasing radio resources for established RBs except the SRB-0 including release of the RLC entity, the PDCP entity, and the SDAP entity in response to determining that the UE (100) is not configured with the MBS broadcast service and not received one or more the MBS broadcast service. At 706, the method includes releasing the RRC configuration except for the default L1 parameter values, the default MAC cell group configuration and the CCCH configuration.

[G] Actions upon reception of the RRCSetup: In an embodiment, service request message and/or paging response message is triggered due to group notification for activation of multicast session. That is, upon reception of group notification (e.g. MCCH, unicast paging, group paging), lower layer (e.g. RRC layer) indicates the upper layer (e.g. NAS layer) for the MBS session Id (or TMGI) and/or activation information for the multicast session.

The UE (100) performs the following actions upon reception of the RRCSetup: preconditions (if the RRCSetup is received in response to an RRCReestablishmentRequest or the RRCSetup is received in response to an RRCResumeRequest or RRCResumeRequest1), the UE (100) discards any stored UE Inactive AS context and suspendConfig, the UE (100) discards any current AS security context including the $K_{RRCenc}$ key, the $KR_{RCint}$ key, the $K_{UPint}$ key and the $K_{UPenc}$ key, the UE (100) releases radio resources for all established RBs except SRB0, including release of the RLC entities, of the associated PDCP entities and of SDAP (except for MRBs for MBS services e.g. broadcast service), the UE (100) releases the RRC configuration except for the default L1 parameter values, default MAC Cell Group configuration and CCCH configuration, and the UE (100) indicates to upper layers fall back of the RRC connection.

[H] Conditional Handover (CHO) for the MBS: In an embodiment, the UE (100) provides MBS interest indication information to the network and same is relayed to the target cell(s)/gNB(s) and consequently, the UE (100) is received with multiple target cell(s)/gNB(s) conditional handover configuration supporting one or more interested MBS services and related configurations along with execution conditions. The UE (100) executes the conditional reconfiguration. When more than one triggered cell exists and MBS session(s) are ongoing, if one or more cells support MBS services, the UE (100) selects the triggered cell which supports maximum number of ongoing MBS sessions and/or MBS session with higher priority as the selected cell for conditional reconfiguration execution; else, select any one of the triggered cells as the selected cell for conditional reconfiguration execution.

In an embodiment, the UE (100) provides to the network device (200) a UE capability information message that carries one or more capabilities information such as support for MBS reception, parallel reception of unicast and MBS, supported BWPs, intra-slot TDM for unicast and/or MBS PDSCH reception, inter-slot TDM for unicast and/or MBS PDSCH reception, number of simultaneous PDCCHs reception for unicast and/or the, number of simultaneous G-RNTIs reception, and support of MRDC with the MBS.

FIG. 8 is a flow diagram (800) illustrating a method for enhancing the MAC reset in the NR MBS communication, according to another embodiment as disclosed herein. Steps (801-805) performs by the UE (100) for enhancing the MAC reset in the NR MBS communication.

At 801, the method includes invoking, by the upper layers (e.g., RRC), the MAC entity to perform MAC reset upon reception of RRC release message with suspend configuration which may transits the UE (100) to the RRC inactive state. At 802, the method includes determining whether the UE (100) is configured with the MBS multicast service and received one or more MBS multicast service in the RRC inactive state.

At 803, the method includes terminating, by the MAC entity, all timers (if running), except MBS multicast DRX timers, the MBS multicast DRX timers includes the DRX on-duration timer for the PTM, the DRX inactivity timer for the PTM, the DRX HARQ Round-Trip-Time (RTT) timer for the PTM, the DRX retransmission timer for the PTM in response to determining that the UE (100) is configured with the MBS multicast service and received one or more MBS multicast service in the RRC inactive state.

At 804, the method includes flushing, by the MAC entity, the soft buffers for all DL HARQ processes, except the soft buffer(s) for DL HARQ process or processes being used for the multicast service.

At 805, the method includes terminating, by the MAC entity, all timers (if running) in response to determining that the UE (100) is not configured with the MBS multicast service and not received one or more MBS multicast service in the RRC inactive state.

At 806, the method includes flushing, by the MAC entity, the soft buffers for all DL HARQ processes.

The various actions, acts, blocks, steps, or the like in the flow diagram (400, 600, 700, and 800) may be performed in the order presented, in a different order or simultaneously. Furthermore, in some embodiments, some of the actions, acts, blocks, steps, or the like may be omitted, added, modified, skipped, or the like without departing from the scope of the invention.

In an embodiment, the UE (100) switches HARQ buffer and/or retransmission to the PTM from the PTP and/or the unicast mode, when the MAC reset operation is performed for the PTP and/or the unicast mode.

In an embodiment, the MBS specific MAC reset operation is performed when the UE (100) receives a RRC Reconfiguration with sync message, and no DAPS bearer is configured to that the UE (100), the UE (100) performs legacy MAC reset for unicast and not MBS specific MAC reset. This may vary case to case. For example, if reconfiguration for sync is received for security key change then, the MBS specific MAC reset is not performed. For another case, both the legacy MAC reset for the unicast and not MBS specific MAC reset can be performed.

The UE (100) performs one or more actions to execute a reconfiguration with sync: the UE (100) resets the MAC entity of this cell group (excluding MBS specific MAC reset e.g. if this is due to security config change), the UE (100) considers the SCell(s) of this cell group, if configured, that are not included in the SCellToAddModList in the RRCReconfiguration message, to be in deactivated state, the UE (100) applies a value of the newUE-Identity as the C-RNTI for this cell group, the UE (100) configures the lower layers in accordance with the received spCellConfigCommon, and the UE (100) configures the lower layers in accordance with any additional fields, not covered in the previous, if included in the received reconfiguration WithSync.

In another embodiment, the MBS specific MAC reset is triggered by the network device (200) when PDCP entity associated with multicast MRBs are re-established (indicated by re-establish PDCP-r17 field or flag), in order to ensure undelivered PDCP PDUs in are not delivered to re-established PDCP entity. The re-establish PDCP-r17 field or flag can be set when there is a MRB type change.

Multicast MRB addition/modification: for each mrb-Identity value included in the mrb-ToAddModList that is part of the current UE (100) configuration.

When the reestablishPDCP is set: the UE (100) indicates to the lower layer that drbContinueROHC is configured when the reestablishPDCP is set. The UE (100) indicates to the lower layer that drb-ContinucEHC-DL is configured when drb-ContinucEHC-DL is included in pdcp-Config. The UE (100) re-establishes the PDCP entity of this multicast MRB as specified in 3GPP TS 38.323 [5], clause 5.1.2. When the pdcp-Config is included, the UE (100) reconfigures the PDCP entity in accordance with the received pdcp-Config. When setting the re-establish PDCP-r17 flag for a MBS multicast radio bearer, the network ensures that the RLC receiver entities do not deliver old PDCP PDUs to the re-established PDCP entity. It does that e.g. by triggering a reconfiguration with sync of the cell group hosting the old RLC entity, involving MBS specific MAC reset or by releasing the old RLC entity. For reestablishPDCP-r17, the UE (100) indicates that PDCP should be re-established. The network device (100) sets this to true whenever MBS bearer type for this radio bearer changes.

In an embodiment, the MBS MAC specific reset operation is performed when all MRBs are released for the UE (100).

Multicast MRB release: for each mrb-Identity value included in the mrb-ToReleaseList that is part of the current UE configuration or for each mrb-Identity value that is to be released as the result of full configuration according to 5.3.5.11, the UE (100) releases the PDCP entity and the mrb-Identity and the UE (100) indicates the release of the multicast MRB and the tmgi of the released multicast MRB to upper layers.

The UE does not consider the message as erroneous if the mrb-ToReleaseList includes any mrb-Identity value that is not part of the current UE configuration. Whether or not the RLC and MAC entities associated with this PDCP entity are reset or released is determined by the CellGroupConfig.

The UE (100) performs the MBS specific MAC reset when all multicast MRBs that are part of the current UE configuration are released.

In an embodiment, during DRB release procedure, if all DRBs configured to the UE (100) is released, the UE (100) performs unicast MAC reset and not the MBS specific MAC reset.

DRB release: for each drb-Identity value included in the drb-ToReleaseList that is part of the current UE (100)

configuration or for each drb-Identity value that is to be released as the result of full configuration according to 5.3.5.11, the UE (100) releases the PDCP entity and the drb-Identity. The UE (100) resets MAC (excluding MBS specific MAC reset) when all DRBs that are part of the current UE configuration are released.

In another embodiment, the UE (100) performs the unicast MAC specific reset when re-establishing unicast PDCP and not performsthe MBS specific MAC reset.

DRB addition/modification: for each drb-Identity value included in the drbToAddModList that is not part of the current UE (100) configuration (DRB establishment including the case when full configuration option is used). When setting the re-establish PDCP flag for a radio bearer, the network ensures that the RLC receiver entities do not deliver old PDCP PDUs to the re-established PDCP entity. It does that e.g. by triggering a reconfiguration with sync of the cell group hosting the old RLC entity, involving MAC reset (excluding MBS specific MAC reset) or by releasing the old RLC entity In an embodiment, the network device (200) signals via a RRC message and/or a MAC Control Element to the UE (100) to perform the MBS specific MAC reset operation.

In an embodiment, the network signals the reset indication as part of MACCellGroupConfig. A field resetMulticastMAC is provided and if resetMulticastMAC is set to true, the MAC entity triggers Multicast MAC Reset.

In an embodiment, when the T304 expires and if any Dual Access Protocol Stack (DAPS) bearer is configured and radio link failure is not detected in the source PCell, then for non-DAPS MBS bearer, if multicast MRB is configured in the source PCell, the UE (100) reverts back to the UE configuration used for the multicast MRB in the source PCell and perform MBS specific MAC reset.

The embodiments disclosed herein can be implemented using at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

The invention claimed is:

1. A method performed by a terminal in a wireless communication system, the method comprising:

receiving a multicast and broadcast service (MBS) broadcast based on an MBS broadcast configuration;

requesting, by an upper layer, a reset of a medium access control (MAC) entity based on a reception of a radio resource control (RRC) release message with a suspend configuration;

stopping, by the MAC entity, all timers, except for MBS broadcast discontinuous reception (DRX) timers; and flushing, by the MAC entity, soft buffers for all downlink (DL) hybrid automatic repeat request (HARQ) processes, except for a DL HARQ process being used for the MBS broadcast.

2. The method of claim 1, further comprising:

requesting, by the upper layer, a reset of the MAC entity based on an expiry of a timer-T300; and releasing a MAC configuration and re-establishing a radio link control (RLC) for all radio bearers (RBs) established except for an MBS radio bearer (MRB) associated with the MBS broadcast.

3. The method of claim 1, further comprising:

releasing all radio resources, including release of a radio link control (RLC) entity, a backhaul adaptation protocol (BAP) entity, a MAC configuration and an associated packet data convergence protocol (PDCP) entity and a service data adaptation protocol (SDAP) entity for all established RBs except for an MBS radio bearer (MRB) associated with the MBS broadcast while going to an RRC_IDLE.

4. The method of claim 1, further comprising:

receiving, from a base station, an RRC setup message;

releasing radio resources for established radio bearers (RBs) except for MBS radio bearers (MRBs) associated with the MBS broadcast; and releasing an RRC configuration except for the MRBs associated with the MBS broadcast.

5. The method of claim 1, further comprising:

receiving a message for configuring the MBS broadcast including information on at least one of DRX related parameters for a point-to-multipoint (PTM) transmission.

6. The method of claim 5, wherein the information on the at least one of the DRX related parameters for the PTM transmission further includes at least one of a DRX on-duration timer for the PTM, a DRX inactivity timer for the PTM, a DRX HARQ round-trip-time (RTT) timer for the PTM and a DRX retransmission timer for the PTM.

7. A terminal in a wireless communication system, the terminal comprising:

a transceiver; and at least one processor configured to:

receive a multicast and broadcast service (MBS) broadcast based on an MBS broadcast configuration, request, by an upper layer, a reset of a medium access control (MAC) entity based on a reception of a radio resource control (RRC) release message with a suspend configuration, stop, by the MAC entity, all timers, except for MBS broadcast discontinuous reception (DRX) timers, and flush, by the MAC entity, soft buffers for all downlink (DL) hybrid automatic repeat request (HARQ) processes, except for a DL HARQ process being used for the MBS broadcast.

8. The terminal of claim 7, wherein the at least one processor is further configured to:

request, by the upper layer, a reset of the MAC entity based on an expiry of a timer-T300, and release a MAC configuration and re-establish a radio link control (RLC) for all radio bearers (RBs) established except for an MBS radio bearer (MRB) associated with the MBS broadcast.

9. The terminal of claim 7, wherein the at least one processor is further configured to:

release all radio resources, including release of a radio link control (RLC) entity, a backhaul adaptation protocol (BAP) entity, a MAC configuration and an associated packet data convergence protocol (PDCP) entity and a service data adaptation protocol (SDAP) entity for all established RBs except for an MBS radio bearer (MRB) associated with the MBS broadcast while going to an RRC_IDLE.

10. The terminal of claim 7, wherein the at least one processor is further configured to:

receive, from a base station, an RRC setup message, release radio resources for established radio bearers (RBs) except for MBS radio bearers (MRBs) associated with the MBS broadcast, and release an RRC configuration except for the MRBs associated with the MBS broadcast.

11. The terminal of claim 7, wherein the at least one processor is further configured to:

receive, via the transceiver, a message for configuring the MBS broadcast including information on at least one of DRX related parameters for a point-to-multipoint (PTM) transmission.

12. The terminal of claim 11, wherein the information on the at least one of the DRX related parameters for the PTM transmission further includes at least one of a DRX on-duration timer for the PTM, a DRX inactivity timer for the PTM, a DRX HARQ round-trip-time (RTT) timer for the PTM and a DRX retransmission timer for the PTM.

13. The method of claim 1, further comprising:

identifying whether the terminal is configured to receive an MBS multicast in an RRC INACTIVE state; and requesting, by the upper layer, a reset of the MAC entity based on the identification that the terminal is configured to receive the MBS multicast in the RRC INACTIVE state.

14. The terminal of claim 7, wherein the at least one processor is further configured to:

identify whether the terminal is configured to receive an MBS multicast in an RRC INACTIVE state, and request, by the upper layer, a reset of the MAC entity based on the identification that the terminal is configured to receive the MBS multicast in the RRC INACTIVE state.

* * * * *